US011256586B2

(12) United States Patent
Satoyama et al.

(10) Patent No.: US 11,256,586 B2
(45) Date of Patent: Feb. 22, 2022

(54) REMOTE COPY SYSTEM AND REMOTE COPY MANAGEMENT METHOD

(71) Applicant: HITACHI, LTD., Tokyo (JP)

(72) Inventors: Ai Satoyama, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 35 days.

(21) Appl. No.: 17/015,192

(22) Filed: Sep. 9, 2020

(65) Prior Publication Data

US 2021/0334181 A1 Oct. 28, 2021

(30) Foreign Application Priority Data

Apr. 28, 2020 (JP) .............................. JP2020-079567

(51) Int. Cl.
*G06F 11/20* (2006.01)
*H04L 29/08* (2006.01)
*G06F 16/10* (2019.01)

(52) U.S. Cl.
CPC ...... *G06F 11/2069* (2013.01); *G06F 11/2074* (2013.01); *G06F 16/10* (2019.01); *H04L 67/1097* (2013.01)

(58) Field of Classification Search
CPC .............. G06F 3/0601; G06F 11/2056; G06F 11/2069; G06F 11/2074; G06F 16/10; G06F 16/27; H04L 67/1095; H04L 67/1097; H04L 67/2842
See application file for complete search history.

(56) References Cited

U.S. PATENT DOCUMENTS

| 2005/0033827 | A1 | 2/2005 | Yamagami |
| 2005/0154937 | A1* | 7/2005 | Achiwa ............... G06F 11/2092 714/6.3 |
| 2011/0251993 | A1* | 10/2011 | Kondo ............... G06F 11/2074 707/613 |
| 2021/0240351 | A1* | 8/2021 | Yokoi ..................... G06F 3/065 |

FOREIGN PATENT DOCUMENTS

| JP | 2569135 B2 * | 1/1997 | |
| JP | 5781716 B2 * | 9/2015 | ........... G06F 16/273 |

* cited by examiner

*Primary Examiner* — Kostas J Katsikis
(74) *Attorney, Agent, or Firm* — Volpe Koenig

(57) ABSTRACT

A failure in a main site is recovered by operating in the same operational environment as a sub site. A remote copy system includes: a first storage system providing a main site; and a second storage system providing a sub site. A storage controller stores data and an operation processed in the main site as a main site journal, sends the main site journal to the sub site for sequential processing, stores data and an operation processed in the sub site as a sub site journal after a failover to the sub site is performed, and cancels an unreflected operation that is not processed in the sub site after being stored in the main site journal prior to the failover in the main site and sequentially processes the sub site journal in the main site, when a failback to the main site is performed.

8 Claims, 15 Drawing Sheets

FIG. 4
VOL MANAGEMENT TABLE

421

| VOL ID (801) | VOL CAPACITY (802) | PAIR ID (803) |
|---|---|---|
| 10:00 | 200GB | 0 |
| 10:01 | 200GB | 1 |
| 10:02 | 200GB | 2 |
| 10:03 | 200GB | 3 |
| ... | ... | ... |

FIG. 5
VOL MAPPING MANAGEMENT TABLE

422

| VOL ID (701) | VIRTUAL VOL ID (702) | VIRTUAL STORAGE SYSTEM ID (703) | HA FLAG (704) |
|---|---|---|---|
| 10:00 | 20:00 | XXX | ON |
| 10:01 | 20:01 | XXX | ON |
| 10:02 | 20:02 | XXX | ON |
| 10:03 | 20:03 | XXX | ON |
| ... | ... | ... | |

FIG. 6

PAIR VOL MANGEMENT TABLE 423

| PAIR ID | PVOL STORAGE SYSTEM ID | PVOL ID | JOURNAL VOL ID | SVOL STORAGE SYSTEM ID | SVOL ID | JOURNAL VOL ID | PAIR STATE |
|---|---|---|---|---|---|---|---|
| 0 | AAA | 10:00 | | BBB | 10:00 | | |
| 1 | AAA | 10:01 | | BBB | 10:01 | | |
| 2 | AAA | 10:02 | | BBB | 10:02 | | |
| | | | | | | | |
| ... | ... | ... | | | | | |

JOURNAL TABLE 424

| VOL ID | START LBA | NUMBER OF BLOCKS | SEQUENCE NUMBER | TIME | DATA | OPERATION |
|---|---|---|---|---|---|---|
| 10:00 | 100 | 4 | | 9:00:01 | | |
| 10:01 | | | | | | SNAPSHOT ACQUISITION |
| | | | | | | |
| | | | | | | |
| ... | ... | ... | | | | |

1001 1002 1003 1004 1005 1006 1007

REMOTE COPY SYSTEM AND REMOTE COPY MANAGEMENT METHOD

BACKGROUND OF THE INVENTION

1. Field of the Invention

The present invention relates to a remote copy system and a remote copy management method.

2. Description of Related Art

Demand for automation of disaster recovery (DR) is high. In the DR, in preparation for data loss when a disaster such as earthquake or fire occurs, a remote copy function of multiplexing and storing data between a plurality of storage systems disposed at a plurality of sites and an operation of the storage system using the function are known.

When a disaster occurs in a main site, an operation of replacing both operations of a server system and the storage system with a sub site is performed. Since the remote copy function takes a long time to respond to writing from the server system between long distance sites, it is common to use asynchronous remote copy in which the storage system transfers the data to a copy destination storage system after completing a response to a write command from the server system.

U.S. Patent Application Publication No. 2005/0033827 discloses a technology of performing asynchronous remote copy using a journal that is information indicating a history related to an update of original data.

In a copy source storage system of the main site, when the write command is received, data are written to a data write volume, journal data are written to a journal volume, and a response is returned to the server system. A copy destination storage system in a remote site reads outs the journal data from the journal volume in the copy source storage system asynchronously with the write command, and stores the journal data in its own journal volume. The copy destination storage system recovers the data copied to a copy destination data write volume based upon the stored journal data.

When a failure occurs in the copy source storage system, an I/O to the copy source storage system is stopped, and after the copy destination storage system completes processing of reproducing the same operational environment as that of the copy source storage system, the I/O can be restarted and an operation can be continuously performed.

SUMMARY OF THE INVENTION

Stopping the I/O when the failure occurs causes deterioration in performance. It is desirable that the copy destination storage system reproduces the same operational environment as that of the copy source storage system without stopping the I/O. It is desirable that an application program (AP) running on the server system is not conscious of a configuration of the storage system, and continues its operation immediately after performing a failover (F.O.) to the copy destination storage system after the failure. A failback (F.B.) is performed after failure recovery.

On the other hand, the copy source storage system performs a volume operation such as snapshot acquisition. A takeover operational environment including the above-described operation is reproduced in the copy destination storage system. Here, for example, when the copy source storage system receives a snapshot acquisition request and acquires a snapshot, and a failure occurs on the main site side after registering a snapshot acquisition operation in the journal volume, since the snapshot acquisition operation is not taken over, the snapshot is acquired by the copy source storage system, and the snapshot is not acquired in the copy destination storage system.

For example, when a partial failure of the main site such as a failure of a main site server or a failure of a data transfer path between the primary and sub sites occurs, a primary storage system normally operates. When there are a large amount of remaining journals that are not taken over to a secondary storage system, the operation is restarted from a state when the takeover is completed without reflecting the journal. In such a case, a snapshot volume that is not taken over to the sub site still remains in the primary storage system. The failure of the main site is recovered and thus the failback is performed, but it is required to manage the snapshot when the snapshot that originally cannot exist in the primary storage system is detected.

The present invention has been made in consideration of the above-described problems, and provides a reverse resync method in which after a failure in a main site is recovered, the main site is caused to have the same operational environment as that of a sub site at that time. Other pieces of processing that are not taken over to the sub site such as snapshot acquisition are snapshot deletion and resync to a snapshot. Even in these cases, it is required to take measures when the failure in the main site is recovered and a failback is performed.

In order to solve the above-described problems, a remote copy system according to one aspect of the present invention includes a first storage system that provides a main site; and a second storage system that provides a sub site. The storage controller of the storage system performs remote copy by storing data and an operation processed in the main site in a journal volume in the first storage system as a main site journal, and by sending the main site journal to the sub site for sequentially performing processing, stores data and an operation processed in the sub site in a journal volume in the second storage system as a sub site journal after a failover from the main site to the sub site is performed, and cancels an unreflected operation that is not processed in the sub site after being stored in the main site journal prior to the failover, and sequentially processes the sub site journal in the main site, when a failback from the sub site to the main site is performed.

According to the present invention, after a failure in a main site is recovered, it is possible to cause the main site to have the same operational environment as that of a sub site at that time.

BRIEF DESCRIPTION OF THE DRAWINGS

FIG. 4 is a diagram illustrating an example of a VOL management table of the remote copy system;

FIG. 5 is a diagram illustrating an example of a VOL mapping management table of the remote copy system;

FIG. 6 is a diagram illustrating an example of a pair VOL management table of the remote copy system;

FIG. 7 is a diagram illustrating an example of a journal table of the remote copy system;

DESCRIPTION OF EMBODIMENTS

Figure 1:
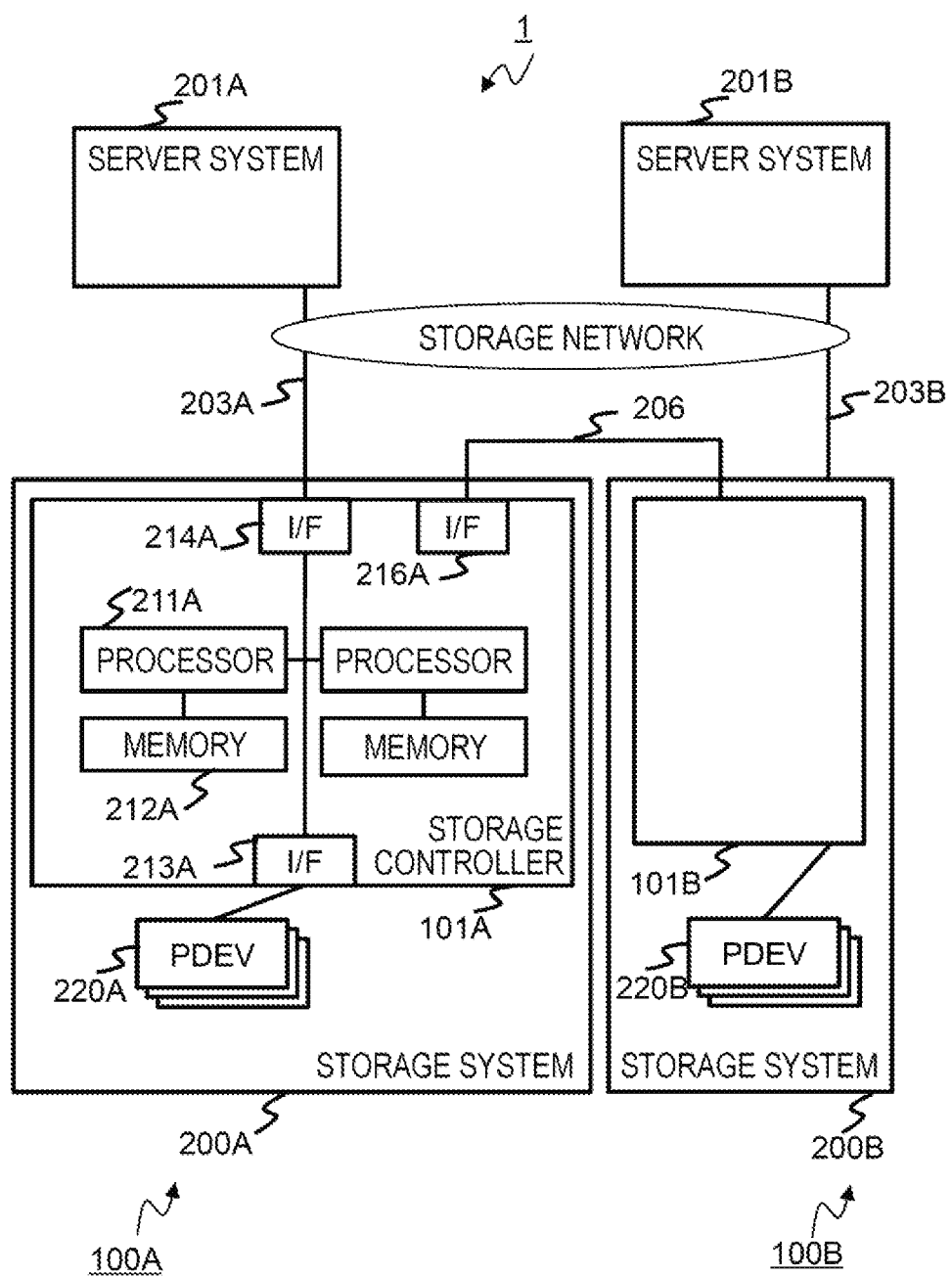
FIG. 1 is a diagram illustrating a physical configuration of a remote copy system according to a first embodiment.

Hereinafter, embodiments of the present invention will be described with reference to the drawings. The embodiments described below do not limit the invention according to the scope of claims, and all the elements described in the embodiments and all the combinations thereof are not essential to a solution method of the invention.

In the following description, an "interface unit" may be one or more interfaces. The one or more interfaces may be one or more same types of communication interface devices (for example, one or more network interface cards (NIC)), and may be two or more different types of communication interface devices (for example, an NIC and a host bus adapter (HBA)).

In the following description, a "memory unit" is one or more memories, and typically may be a primary storage device. At least one memory in the memory unit may be a volatile memory or a non-volatile memory.

In the following description, a "PDEV unit" is one or more PDEVs, and typically may be an auxiliary storage device. The "PDEV" indicates a physical storage device, and is typically a non-volatile storage device such as a hard disk drive (HDD) or a solid state drive (SSD). Alternatively, the "PDEV" may be a flash package.

The flash package is a storage device that includes a non-volatile storage medium. A configuration example of the flash package includes a controller and a flash memory which is a storage medium for storing write data from a computer system. The controller includes a logical circuit including a drive I/F, a processor, a memory, and a flash I/F, which are connected to each other via an internal network.

In the following description, a "storage unit" is at least one of the memory unit and the PDEV unit (typically at least the memory unit).

In the following description, a "processor unit" is one or more processors. At least one processor is typically a microprocessor such as a central processing unit (CPU), and may be another type of processor such as a graphics processing unit (GPU). At least one processor may be a single-core or a multi-core.

At least one processor may be a processor in a broad sense such as a hardware circuit (for example, a field-programmable gate array (FPGA) or an application specific integrated circuit (ASIC)) that performs a part or all of the processing.

In the following description, information that can obtain an output with respect to an input will be described by a description referred to as a "xxx table", and the information may be data of any structure, or may be a learning model such as a neural network generating the output with respect to the input. Therefore, the "xxx table" can be referred to as "xxx information".

In the following description, a configuration of each table is an example, and one table may be divided into two or more tables, or all or a part of the two or more tables may be one table.

In the following description, processing may be described by using a "program" as a subject, and the program is executed by the processor unit such that predetermined processing is performed while appropriately using the storage unit and/or the interface unit. Therefore, the subject of processing may be the processor unit (or a device such as a controller including the processor unit).

The program may be installed in a device such as a computer, or may be, for example, in a program distribution server or a computer-readable (for example, non-temporary) recording medium. In the following description, two or more programs may be implemented as one program, and one program may be implemented as two or more programs.

In the following description, the "computer system" is a system including one or more physical computers. The physical computer may be a general-purpose computer or a dedicated computer. The physical computer may function as a computer that issues an input/output (I/O) request (for example, referred to as a host computer and a server system), and may function as a computer that performs the I/O of data in response to the I/O request (for example, a storage device).

That is, the computer system may be at least one of one or more server systems that issue the I/O request and a storage system which is one or more storage devices that perform the I/O of data in response to the I/O request. In at least one physical computer, one or more virtual computers (for example, virtual machine (VM)) may be executed. The virtual computer may be the computer that issues the I/O request or the computer that performs the I/O of data in response to the I/O request.

The computer system may be a distributed system formed of one or more (typically a plurality of) physical node devices. The physical node device is the physical computer.

Software-defined anything (SDx) may be constructed in a physical computer or a computer system including the physical computer by causing the physical computer (for example, the node device) to execute predetermined software. As the SDx, for example, a software defined storage (SDS) or a software-defined datacenter (SDDC) may be adopted.

For example, the storage system as the SDS may be constructed by executing software having a storage function in a physical general-purpose computer.

At least one physical computer (for example, the storage device) may execute one or more virtual computers as the server system and a virtual computer as a storage controller of the storage system (typically, a device that inputs and outputs data to and from the PDEV unit in response to the I/O request).

In other words, such at least one physical computer may have both a function as at least a part of the server system and a function as at least a part of the storage system.

The computer system (typically the storage system) may have a redundant configuration group. The redundant configuration may be configured with a plurality of node devices such as Erasure Coding, redundant array of independent nodes (RAIN), and inter-node mirroring, and may be configured with a single computer (for example, the node device) such as one or more groups of redundant array of independent (or inexpensive) disks (RAID) as at least a part of the PDEV unit.

In the following description, an identification number is used as identification information for various targets, and identification information of a type other than the identification number (for example, an identifier including an alphabetic character or a sign) may be adopted.

In the following description, when the same type of elements is described without distinguishing the elements from each other, a reference sign (or a common sign among the reference signs) is used. When the same type of elements is described while distinguishing the elements from each other, the identification number (or the reference sign) of the element may be used.

A remote copy system of the embodiment includes the following configuration as an example.

An asynchronous remote copy configuration is set as an HA configuration. An I/O received on the main site side and a volume operation for requesting snapshot acquisition, deletion, resync with respect to a volume on the main site side are recorded in a journal volume in the main site. By transferring a journal to the sub site, the I/O and the snapshot related request can be reproduced on the sub site side.

First Embodiment

Hereinafter, a first embodiment will be described with reference to the drawings.

<System Configuration>

Figure 2:
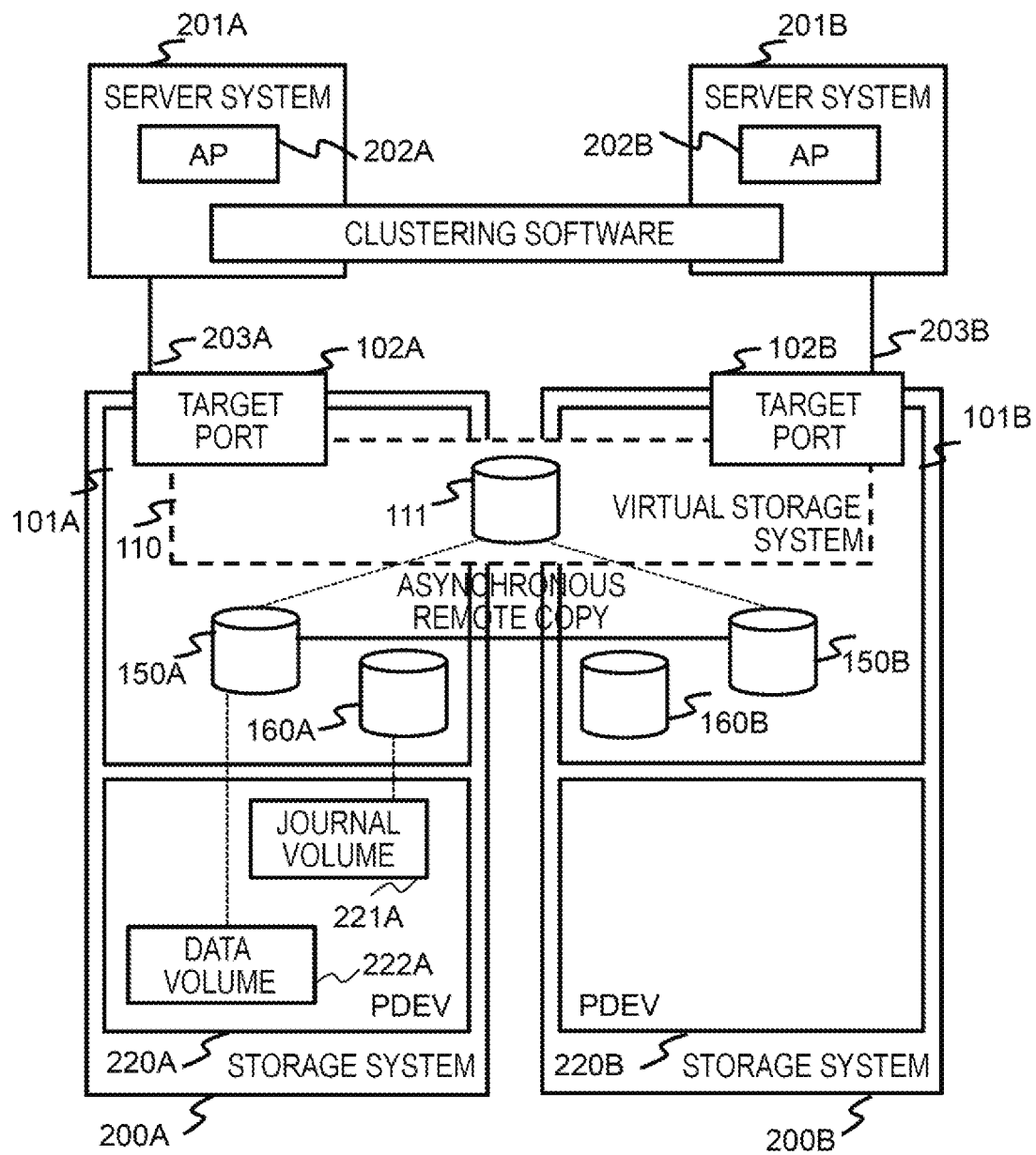
FIG. 2 is a diagram illustrating a logical configuration of the remote copy system.

FIG. 1 is a diagram illustrating a physical configuration of a remote copy system 1 according to a first embodiment, and FIG. 2 is a diagram illustrating a logical configuration of the remote copy system 1 according to the first embodiment.

The importance of disaster recovery (DR) increases as a countermeasure against a disaster such as an earthquake. Remote copy is one of the configurations that realizes high availability (HA) of a storage system.

Since a storage system 200 constructs a remote copy configuration, there are two or more sites, such as a primary site (a main site) 100A and a secondary site 100B (a sub site). Hereinafter, in order to make the description easier to understand, a reference sign of an element that the primary site 100A includes is a combination of a parent number and a child sign "A", and a reference sign of an element that the secondary site 100B includes is a combination of a parent number and a child sign "B". When it is not required to distinguish between the primary site 100A and the secondary site 100B, the reference sign is used with only the parent number.

The primary site and the secondary site of the remote copy configuration are often constructed with the same type of storage system. Here, an object of the invention is to provide a system that can perform a failover when a failure occurs and continuously perform processing, and since a remote copy function is used as one of the methods without the purpose of forming the remote copy configuration, it is not requirement of the invention to prepare a type of storage system that forms the remote copy configuration.

A data volume 222A (refer to FIG. 2) provided in a storage system 200A on the side of the primary site 100A, which is a copy source of data replication by the remote copy, is hereinafter referred to as "a primary volume or a main volume (PVOL)", and a data volume (not illustrated in FIG. 2) provided in a storage system 200B on the secondary side, which is a replication destination of the data stored in the PVOL, is hereinafter referred to as "a secondary volume, a secondary side (S) volume (SVOL)". A storage source of the replicated data is referred to as the primary site, the main site, or a local site. A destination for storing the replication is referred to as the secondary site, the sub site, or a remote site.

The remote copy function is roughly divided into two types: "synchronous remote copy" in which the storage system transfers data to a copy destination storage system in synchronization with a write command from the server system; and "asynchronous remote copy" in which the storage system transfers the data to the copy destination storage system after completing a response to the write command from the server system.

Regardless of which remote copy function is used, when a disaster occurs in the main site, operations of both the server system and the storage device are replaced with the sub site. Accordingly, data loss and operation interruption can be minimized even though the disaster occurs in the site.

The synchronous remote copy has an advantage of constantly synchronizing the copy source data and the copy destination data, but since the synchronous remote copy takes a long time to respond to writing from the server system, it is common to use the asynchronous remote copy between long distance sites. The storage system may be mounted with a flash medium, and the asynchronous remote copy is used to take advantage of the high performance of the flash medium.

Hereinafter, a case of adopting an asynchronous remote copy function will be described.

Another method of HA also includes a method of forming the remote copy configuration for each volume. Here, a method of determining the copy source and the copy destination for each storage system 200 will be described.

The storage system 200 includes a storage controller 101 as illustrated in FIG. 1. The storage controller 101 is an example of a controller including a processor 211. The storage controller 101 has a virtual storage system function, the asynchronous remote copy function, and a failure management function for processing failure detection and a failover.

The storage system 200 includes a plurality of (or one) PDEV 220 which are physical storage devices, and the storage controller 101 connected to the PDEV 220.

The storage controller 101 includes an I/F 214, an I/F 216, an I/F 213, a memory 212, and the processor 211 connected thereto. The I/F 214, the I/F 216, and the I/F 213 are examples of the interface unit. The memory 212 is an example of the storage unit. The processor 211 is an example of the processor unit.

The I/F 214 is a communication interface device that mediates an exchange of data between a server system 201 and the storage controller 101. The server system 201 is connected to the I/F 214 via a fibre channel (FC) network 203.

The server system 201 transmits, to the storage controller 101, an I/O request (a write request or a read request) that designates an I/O destination (for example, a logical volume number such as a logical unit number (LUN) or a logical address such as a logical block address (LBA)). The server system 201 includes, for example, an input device, an output device, a central processing unit (CPU), a memory, a disk adapter, a network adapter, and a storage device (not illustrated). In each server system 201, an application program (AP) 202 used by a user (refer to FIG. 2) and a storage system control program for performing interface control with the storage controller 101 are also executed by the CPU provided in the server system 201.

The I/F 216 is a communication interface device that mediates an exchange for generating an HA configuration between the storage system 200A and the storage system 200B. Since the HA configuration uses the asynchronous remote copy, the I/F for the remote copy may be used. The I/F 216 is connected to another storage system 200 via an inter-storage system network 206. The inter-storage system network 206 is often a global network such as a public line from a viewpoint of disaster recovery, and may be a local network when the storage systems are in the same room, in the same building, or in a neighboring building. However, the present invention is not limited to such a network form.

The I/F 213 is a communication interface device that mediates an exchange of data between the plurality of PDEVs 220 and the storage controller 101. The plurality of PDEVs 220 are connected to the I/F 213.

The memory 212 stores a program to be executed by the processor 211 and data to be used by the processor 211. The processor 211 executes a program stored in the memory 212. For example, a set of the memory 212 and the processor 211 is replicated.

The PDEV 220 is formed of a plurality of storage devices. The storage device is formed of, for example, a hard disk drive, and mainly stores user data. The storage device may be a drive formed of a semiconductor memory such as a flash memory. The storage device forms a RAID group based upon a RAID configuration.

In the PDEV 220, one or more logical storage areas (logical volumes) 221 and 222 (refer to FIG. 2) are generated based upon the RAID group. The logical volume is associated with a physical storage area provided in the PDEV 220. These logical volumes are used as a journal volume 160 of a volume for storing a data volume and a journal such as PVOL 150A and SVOL 150B according to user's designation.

Even though the volumes 150 and 160 are so-called LDEVs whose volume capacity and actual capacity match each other, the volumes 150 and 160 may be a thin provisioning volume that allocates a page (a unit of the storage area) from a pool. All the volumes may be configured based upon a storage medium provided in another storage system which is not illustrated. Here, when the volume is accessed from the server system, the accessed storage system communicates with another storage system including the storage medium and responds to the server system.

The storage system 200 can also be referred to as a storage device or a storage subsystem.

In a device other than the storage system 200A and the storage system 200B, for example, a Quorum (not illustrated) which is a storage area disposed in the storage system 200 may be disposed. For example, in the Quorum, when communication between the storage system 200A and the storage system 200B having the HA configuration cannot be performed, the storage system 200A and the storage system 200B write, to the Quorum, a state of each storage system and a communication state to the other storage system when viewed from each storage system, and each storage system refers to the Quorum periodically or in synchronization with an I/O response, thereby providing a function of determining which one is continuously operated and which one is stopped based upon the information written in the Quorum.

The network 203 may be a storage network. Data are transmitted and received between a server system 201A (a server system 201B) and the storage system 200A (the storage system 200B) via the storage network. The storage systems 200 communicate with each other via the storage network.

As illustrated in FIG. 2, the storage system 200A and the storage system 200B provide a virtual storage system 110 to the server system 201A and the server system 201B.

The volume 150A, which is a volume of the storage system 200A, and the volume 150B, which is a volume of storage system 200B, store the same data, indicates the same identifier (for example, ID) to the server system 201, and is provided as one virtual volume 111 of the virtual storage system 110.

The identifier of the virtual storage system 110 (for example, a manufacturing number (S/N)) is XXX. On the other hand, the storage system 200A and the storage system 200B respectively include a manufacturing number AAA and a manufacturing number BBB. The server system 201 recognizes the virtual storage system 110 as the storage system of the manufacturing number XXX including a target port 102A and a target port 102B.

The volumes 150A and 150B form an HA volume pair, and form one virtual volume 111. The IDs of the volumes 150A and 150B are 10:00 and 30:00, respectively. On the other hand, the ID of the virtual volume 111 is 20:00.

The server system 201 is provided with the virtual volume 111 from the virtual storage system 110 and recognizes the virtual volume 111 as a volume having the VOL ID of 20:00. The storage system 200A is the main site (a normal system) that performs a normal operation, and the storage system 200B is the sub site (a standby system, a standby site) that reproduces a data state of the main site in order to continuously perform an operation when a failure occurs in the main site. The server system 201 can access the virtual volume 111 via any one of the target ports 102A and 102B. The server system 201A accesses the virtual volume 111 via only the target port 102A, and the server system 201B accesses the virtual volume 111 via only the target port 102B.

The server system 201A and the server system 201B are cooperatively operated as one system by clustering software. Accordingly, even though the failure occurs in the server system 201A, the server system 201B can continuously perform the operation. For example, the server system 201A on the side of the main site 100A performs the normal operation in the normal system, the server system 201B on the side of the sub site 100B stands by in the standby system, and the I/O is not received while the normal system is in operation. When the server system 201A in the normal system cannot operate due to the failure, the failover is performed in the server system 201B, the server system 201B becomes the normal system, and an AP 202B continuously performs processing instead of an AP 202A.

The storage system 200A of the main site 100A and the storage system 200B of the sub site 100B are connected to each other via the inter-storage system network 206, thereby forming the remote copy. A remote copy control program 412 defines the volume in the storage system 200A as the primary volume (PVOL) of the remote copy 150A, and defines the volume in the storage system 200B as the secondary volume (SVOL) of the remote copy 150B, thereby forming a pair of remote copies. After the pair is generated, the pair is registered in a pair VOL management table 423.

Here, it is not required to set up and construct a related-art remote copy configuration, and it is desirable to perform the operation and data transfer between the storage systems 200 by using a journal transfer technology of the remote copy. By generating the pair, the pair is allocated to a virtual volume which will be described later. The virtual storage system may be constructed and the volumes of the two storage systems 200 may be allocated to the virtual volume, thereby being registered as the pair. The main site 100A and the sub site 100B may have the same hardware configuration, the same hardware performance, and the same number, or may have different configuration.

A journal management program 413 of each site is used, a journal volume that stores a journal corresponding to the pair of PVOL 150A and SVOL 150B is allocated, and the allocated journal volume is registered in the pair VOL management table 423. Accordingly, the data of the copy source storage system 200A on the main site side can be reflected to the copy destination storage system 200B which is the sub site side in the order of an operation such as a command with respect to the data, the I/O, and the volume.

The virtual storage system 110 performs setting by mapping both the PVOL 150A of the storage system 200A of the main site and the SVOL 150B of the storage system 200B of the sub site, which are the generated pair, to the virtual volume 111 of the virtual storage system 110, and by registering both the PVOL 150A and the SVOL 150B mapped thereto in a VOL mapping management table 422.

Although not illustrated in FIGS. 1 and 2, a management device may be provided in the remote copy system 1. The management device manages the configuration of the storage area of the storage system 200, and includes, for example, the input device, the output device, the CPU, the memory, the network adapter, and the storage device. The Quorum may be responsible for the management device.

Figure 3:
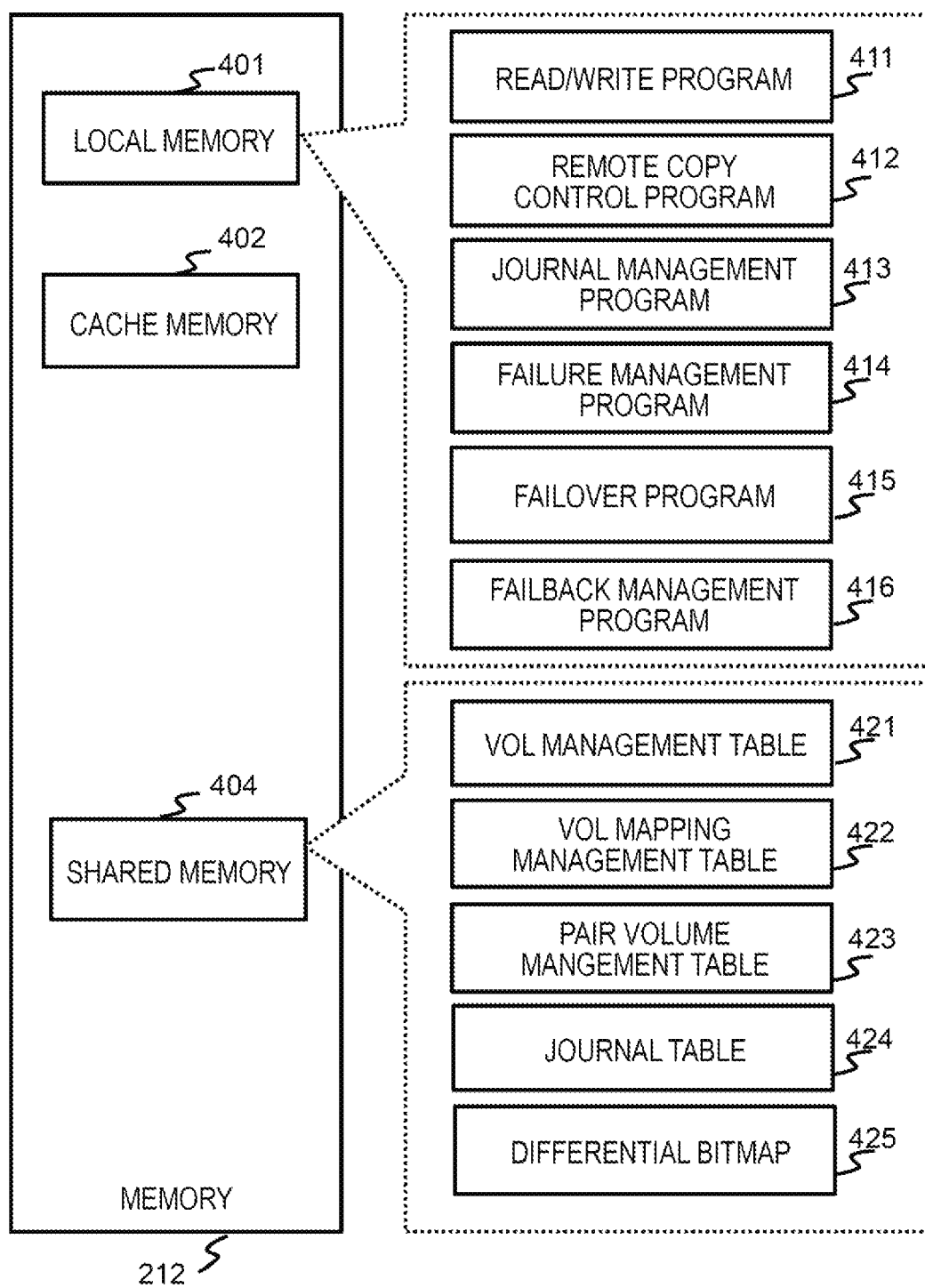
FIG. 3 is a diagram illustrating an example of a memory configuration of a storage controller of the remote copy system.

FIG. 3 is a diagram illustrating an example of a configuration of the memory 212 of the storage controller 101 of the remote copy system 1 according to the first embodiment, and more specifically, is a diagram illustrating an example of the configuration of the memory 212 and a program and management information in the memory 212.

The memory 212 includes a memory area referred to as a local memory 401, a cache memory 402, and a shared memory 404. At least one of these memory areas may be an independent memory. The local memory 401 is used by the processor 211 belonging to the same set as the memory 212 including the local memory 401.

The local memory 401 stores a read/write program. 411, a remote copy control program 412, a journal management program 413, a failure management program 414, a failover management program 415, and a failback management program 416. These programs will be described later. Other programs which are not illustrated are also stored in the shared memory 404.

The cache memory 402 temporarily stores a data set to be written or read with respect to the PDEV 220.

The shared memory 404 is used by both the processor 211 belonging to the same set as the memory 212 including the shared memory 404 and the processor 211 belonging to a different set. The management information is stored in the shared memory 404.

The management information includes a VOL management table 421, the VOL mapping management table 422, the pair VOL management table 423, a journal table 424, and a differential bitmap 425. The volume is referred to as VOL.

<Management Information>

Next, a configuration example of each table which is the management information will be described.

FIG. 4 is a diagram illustrating an example of the VOL management table 421 of the remote copy system 1 according to the first embodiment.

The VOL management table 421 stores information on the VOL. For example, the VOL management table 421 has an entry for each VOL. Each entry stores information such as a VOL ID 801, a VOL capacity 802, and a pair ID 803. Hereinafter, one VOL (referred to as a "target VOL") will be described as an example.

The VOL ID 801 is information on a number (an identification number) of the target VOL. The VOL capacity 802 is information on the capacity of the target VOL and indicates a so-called volume size. The pair ID 803 is pair information that combines the VOL ID 801 and the HA configuration, and indicates a pair ID of the pair VOL management table 423.

Although not illustrated, the VOL management table 421 manages other information such as attributes of a volume (I/O volume or journal volume), a group of physical hard disk numbers that forms a volume, a RAID level that forms a volume from a physical hard disk, a LU number, and a physical port number.

FIG. 5 is a diagram illustrating an example of the VOL mapping management table 422 of the remote copy system 1 according to the first embodiment.

The VOL mapping management table 422 causes actual configuration information of the volume provided in the storage system 200 to be associated with virtual configuration information. Specifically, the VOL mapping management table 422 includes a VOL ID 701, a virtual VOL ID 702, a virtual storage system ID (a product number as an example) 703, and an HA flag 704.

Each entry indicates the virtual VOL ID with which the volume is associated, the virtual storage system ID that provides the virtual volume, and whether the volume forms the HA volume pair. When a value of the HA flag is ON, the volume forms the HA volume pair with another volume. Here, all the volumes are ON because all the volumes form the HA configuration. The HA configuration is the remote copy configuration.

FIG. 6 is a diagram illustrating an example of the pair VOL management table 423 of the remote copy system 1 according to the first embodiment.

The pair VOL management table 423 is information for managing a remote copy pair. The pair VOL management table 423 is stored at least on the side of the storage system 200A. Here, the pair VOL management table 423 is stored in the storage system 200.

The PVOL ID indicates a volume which is a copy source of the remote copy. The SVOL indicates a volume which is a copy destination of the remote copy.

The pair VOL management table 423 includes: a pair ID 901 that identifies the remote copy pair; a PVOL storage system ID 902, a PVOL ID 903, and a journal VOL ID 904 for storing a journal as PVOL information which is a replication source of remote copy data; and an SVOL storage system ID 905, an SVOL ID 906, a journal VOL ID 907 for storing the journal, and a pair state 908 as SVOL information which is a replication destination of the remote copy data.

The storage system ID 902 and the storage system ID 905 are identifiers of each storage system 200 in which the volume exists, for example, a manufacturing number (S/N).

The PVOL ID 903 and the journal VOL ID 904, and the SVOL ID 906 and the journal VOL ID 907 are identifiers of the volume in each storage system 200. The volume is uniquely determined by each of these IDs.

The pair state 908 represents anyone of a "COPY" state in which data are being copied from one volume of the pair to the other volume thereof, a "PAIR" state in which the two volumes which are paired are synchronized, and a "SUSPEND" state in which the two volumes which are paired are unsynchronized, all of which indicate a replication state.

FIG. 7 is a diagram illustrating an example of the journal table 424 of the remote copy system 1 according to the first embodiment.

The journal is information representing a history related to an update of original data. The journal is formed of a data portion which is a copy of data and management information of the data. The management information includes information of a data update performed in the PVOL 150A, and for example, the information of the data update can includes, for example, a VOL ID 1001, a start LBA 1002, number of blocks 1003, a sequence number 1004, time 1005, data 1006, and an operation 1007.

The VOL ID 1001 is information for identifying the PVOL 150A. The start LBA 1002 is a logical block address indicating the head of the write data to be written in the PVOL 150A. The number of blocks 1003 is information indicating a data size of the write data. The sequence number 1004 is an identification number to be set with a serial number in the journal data. The time 1005 is the time when the write request is issued. The data 1006 are pointer information indicating a position (an address) where a data main body is stored. The operation 1007 is stored when there are request setting of request, deletion, and resync for processing the snapshot acquisition; and a request for processing the snapshot acquisition (a command). In the case of the write request, the write request may be stored in the operation 1007, but in principle, the information is not used. When there is a request such as setting with respect to the volume, the request is registered in the operation 1007, and in the case of another request other than the write request, the start LBA 1002, the number of blocks 1003, and the data 1006 are not used.

The remote copy system 1 according to the first embodiment is set. The server system 201A and the server system 201B cooperate each other by clustering software. The server system 201A on the side of the main site 100A performs the normal operation in the normal system, the server system 201B on the side of the sub site 100B stands by in the standby system, and the I/O is not received while the normal system is in operation. When the server system 201A in the normal system cannot operate due to the failure, the failover is performed in the server system 201B, the server system 201B becomes the normal system, and the AP 202B continues to perform the processing instead of the AP 202A. When the failure of the server system 201A of the main site system is recovered, the failback is performed, and the server system 201A is set to the normal system, thereby returning to the processing.

The storage system 200A in the main site 100A and the storage system 200B in the sub site 100B are connected to each other via the inter-storage system network 206, and the remote copy is configured for performing the operation and the data transfer between the storage systems 200 by the journal transfer technology of the remote copy. The remote copy control program 412 forms the remote copy pair by setting the volume in the storage system 200A as the primary volume (PVOL) 150A of the remote copy and setting the volume in the storage system 200B as the secondary volume (SVOL) 150B of the remote copy. A journal volume for storing journals corresponding to a pair of the PVOL 150A and the SVOL 150B is allocated. After allocated, the journal volume is registered in the pair VOL management table 423. The pair is allocated to the virtual volume of the virtual storage system and registered in the VOL mapping management table 422.

Figure 8:
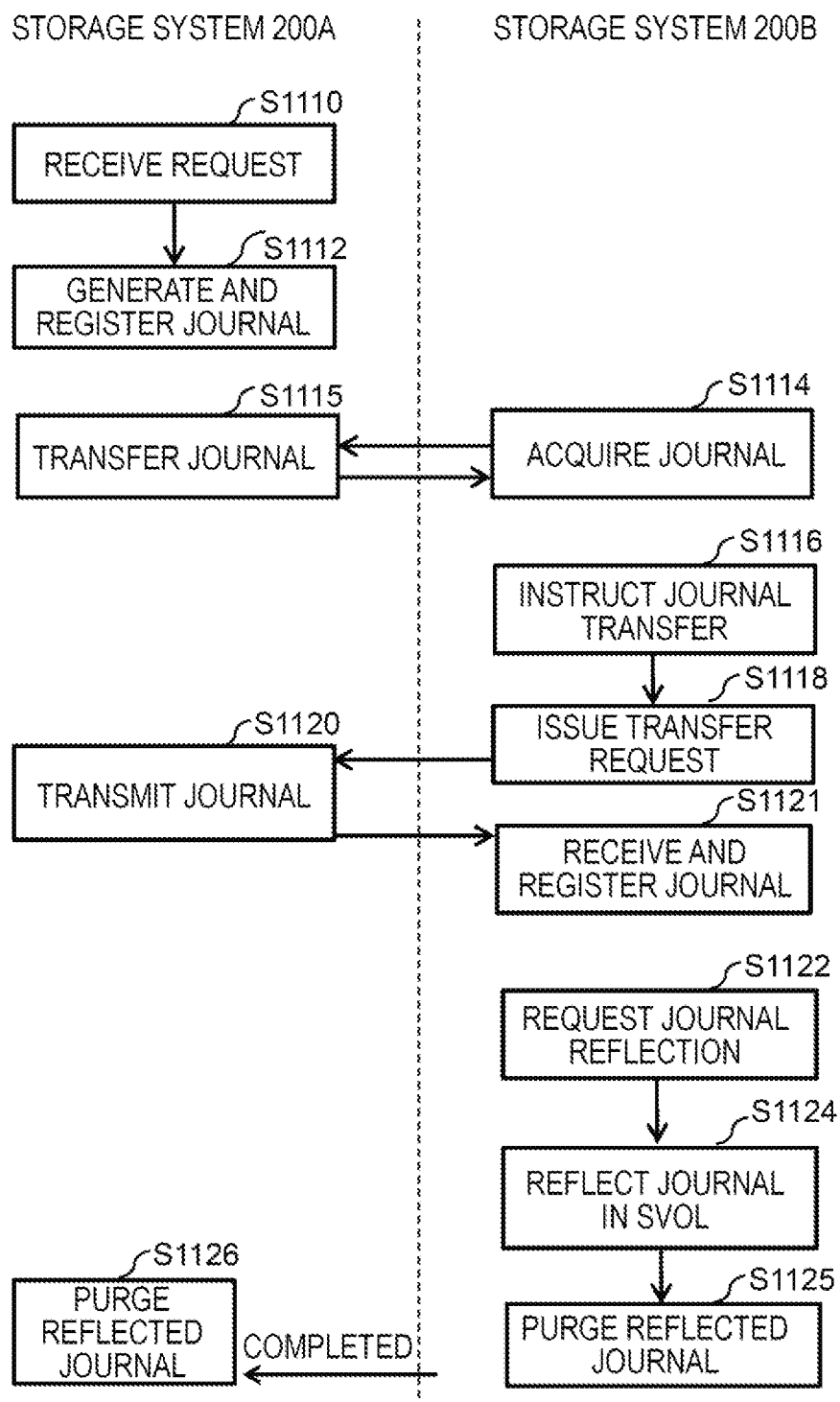
FIG. 8 is a flowchart illustrating an example of journal processing of the remote copy system.

FIG. 8 is a flowchart illustrating an example of journal processing of the remote copy system 1 according to the first embodiment.

During the normal operation, a request to the storage system 200A of the main site 100A is received.

When the read/write program 411 of the storage system 200A receives a write request to the remote copy source volume PVOL 150A from the server system 201A (S1110), the read/write program 411 thereof executes processing for writing received data to a designated address of the PVOL 150A according to the write request. When the write request is executed, the journal management program 413A generates a journal of the executed write request. The VOL ID of the volume which becomes a target of the write request is referenced from the VOL management table 421, and a write target position indicated in the write request is registered in the start LBA 1002 and the number of blocks 1003, respectively. The time when the write request is received is registered in the time 1005.

The write data are replicated for the journal and stored separately in a storage area of a journal dedicated area, and an address to the storage area is registered in the data 1006. The journal generated as described above is registered in the journal table 424, and the journal table 424 is stored in a journal volume 160A (S1112).

Here, the journal management program 413 refers to the VOL management table 421, the pair VOL management table 423, and the journal table 424 stored in the shared memory 404 of the storage system 200A to determine a journal storage destination, acquires the next number of the latest sequence number 1004 of the journal table 424 as a sequence number, generates anew journal, and adds the generated new journal to the journal table 424 in the journal volume 160A.

The storage system 200A responds to the completion of writing to the server system 201A when the writing to the storage system 200A is completed. The transfer of the journal from the storage system 200A to the storage system 200B is performed asynchronously with the write request.

The storage system 200B acquires information on the journal of the storage system 200A at a predetermined timing such as every fixed period. In the storage system 200B, the journal management program 413B sends a request for acquiring information on a journal generation state from the storage system 200A to the storage system 200A (S1114). The information on the journal generation state is, for example, a capacity of the journal in the journal volume, and the oldest time of the journal.

The journal management program 413A transfers the information on the journal generation state to the storage system 200B according to the request (S1115). The journal management program 413B generates a journal transfer request by using the acquired information.

Next, the processing of transferring the journal from the storage system 200A to the storage system 200B will be described.

In the storage system 200B, when a journal transfer instruction is generated according to an instruction input from a user via a GUI or according to a predetermined schedule (S1116), the journal management program 413B issues the journal transfer request to the storage system 200A (S1118). The schedule is, for example, the time when a fixed amount of journals are stored in the journal volume 160A in the storage system 200A, and every fixed period.

The journal transfer request includes: a journal (or a plurality of journals) to be copied; the journal volume 160A in which the journal is stored; information designating the storage system 200A including the journal volume; and information designating a journal volume 160B in which the copied journal is stored. The journal management program 413B generates the journal transfer request from information acquired from the VOL management table 421 and the pair VOL management table 423 in the shared memory 404.

The journal management program 413B issues a read command with respect to the journal designated by the journal transfer request to the storage system 200A.

The journal management program 413A of the storage system 200A that receives the read command transmits the journal designated by the read command to the storage system 200B (S1120). The journal management program 413B of the storage system 200B that receives the journal stores the received journal in the journal volume 160B designated by the journal transfer request (S1121).

After that, the journal management program 413B of the storage system 200B issues a journal reflection request (S1122). The journal management program 413B that receives the journal reflection request writes journal data in the SVOL 150B according to a sequence number of the journal of the journal volume 160B, thereby reflecting the data of PVOL 150A in the SVOL 150B (S1124).

After that, an area where the journal used for reflecting the data is stored is purged (S1125). Accordingly, the area can be used to store a new journal.

The journal management program 413B notifies the journal management program 413A of the storage system 200A of the sequence number of the journal in which the data are reflected in the SVOL 150B. Accordingly, the journal management program 413A releases an area of the journal volume 160A in the storage system 200A in which the journal reflected in the SVOL 150B is stored (S1126). The area can be used to store a new journal. It is not required to purge the journal immediately after receiving the notification. The journal may be purged on a regular basis, or according to an instruction from the user.

According to the above-described journal processing, the asynchronous remote copy from the PVOL 150A to the SVOL 150B can be performed. By a remote copy technology, it is possible to keep the order of operations between storage systems at a remote place.

The embodiment describes the write request, and even when a snapshot acquisition request is issued to the volume of the storage system 200A, the snapshot acquisition request is registered in the journal and executed, in the same manner. When the storage system 200A generates a snapshot, snapshot generation is registered in the operation 1007 of the journal table 424, and the storage system 200B reads the journal and generates a snapshot of the SVOL 150B according to detection of the snapshot generation.

It may be required to use the synchronous remote copy depending on an operation. For example, in the case of a request to change the capacity of the volume (volume expansion or volume reduction), when a failure occurs before the request is executed on the primary side and the request is executed on the secondary side, volume consistency cannot be obtained during the reverse resync from the secondary side. Such operation is performed synchronously in the primary and sub sites.

FIGS. 9 to 14 illustrate an operation outline of an example of a failover of the remote copy system 1 according to the first embodiment.

Figure 9:
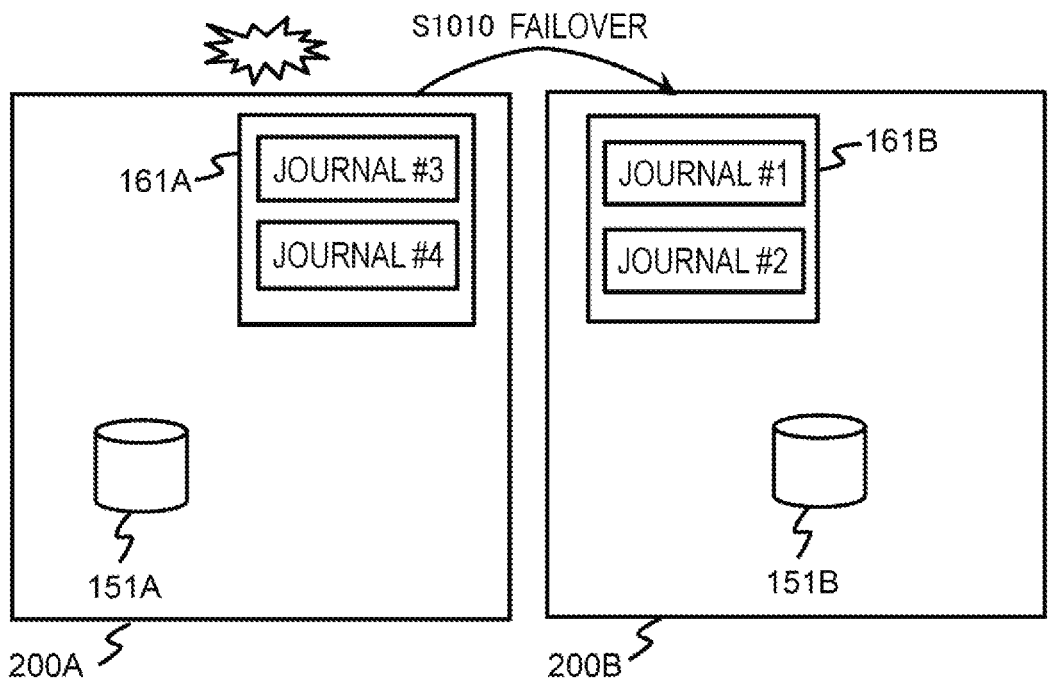
FIG. 9 is a diagram illustrating an example of failover processing of the remote copy system.

FIG. 9 illustrates an example of failover processing of the remote copy system 1 according to the first embodiment. The same data are stored in a volume 151A which is the volume of the storage system 200A in the main site and a volume 151B which is the volume of the storage system 200B in the sub site, and provided to a host (not illustrated) which is a high-level computer as one virtual volume 111 (not illustrated) of the virtual storage system 110. Journal #1 to journal #4 are journals of the write request to the volume 151A, and are stored in a journal volume 161 in time-series order. A write request time of the journal #1 is the earliest, and a write request time of the journal #4 is the latest. With respect to the journal #1 and the journal #2, the journal transfer to the storage system 200B is completed after the processing is completed in the storage system 200A, and the journal #1 and journal #2 are in a state before a journal write request is reflected in the storage system 200B. The journal #3 and the journal #4 are in a state where the journal transfer to the storage system 200B is not completed. That is, the write requests shown in the journals #1 to #4 are already executed for the volume 151A, and all the write requests shown in the journals #1 to #4 are not executed for the volume 151B.

A failure occurs on the primary server side at the timing of this state, and the failure management program 414B on the side of the sub site 100B detects the failure of the main site 100A. The storage system 200B monitors a life-and-death state of the storage system 200A. The failure management program 414B of the storage system 200B periodically transmits information (for example, a message, a signal, a command, or data) to the failure management program 414A. When the failure management program 414A receives the information from the failure management program 414B, the failure management program 414A returns a response thereto. When there is the response from the failure management program 414A, it can be confirmed that the storage system 200A is normally operating. If there is no response therefrom, it cannot be confirmed that the storage system 200A is normally operating so that the failure management program 414B detects that the failure occurs in the storage system 200A.

A method of confirming the life-and-death state of the other storage system is an example, and is not the essence of the invention.

The failure is detected in the storage system 200A, and processing for performing the failover is executed in the storage system 200B. The storage system 200A in which the failure is detected is reset and the server system 201B is restarted. The clustering software operates the AP 202B as the normal system and starts the failover processing. Thereafter, the access is switched from the AP 202B to the storage system 200B (S1010).

The storage system 200B receives, from the AP 202B, a request for the logical volume that the failed storage system 200A is in charge of. Since the logical volume recognized by the AP 202 is the virtual volume 111, an access to the virtual volume 111 is not changed, and the SVOL 150B is mapped to the virtual volume 111 and the processing is continuously performed. That is, the virtual volume 111 having the same identifier (ID) is simultaneously provided to the storage system 200A and the storage system 200B which are a failover pair, the storage system 200A is accessed during the normal time, and the storage system 200B is accessed during the failure time.

Figure 10:
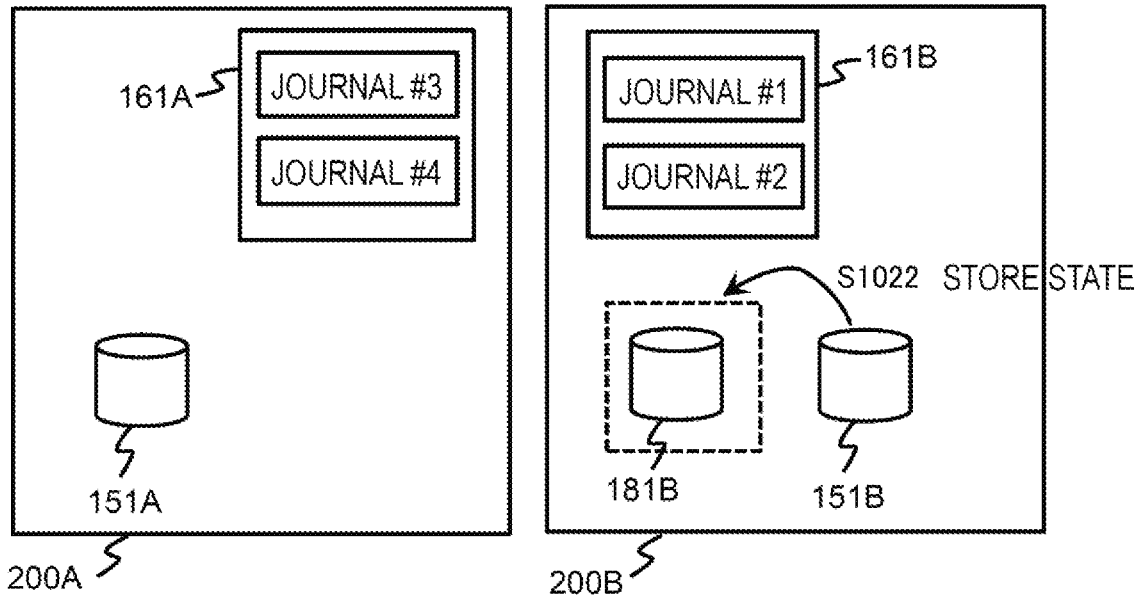
FIG. 10 is a diagram illustrating an example of processing of a secondary storage system at the time of failover of the remote copy system.

FIG. 10 illustrates processing of determining which time after the failover is to be a recovery time for restarting the operation. The journal volume 161B includes the journal #1 and the journal #2 that are not reflected in the volume 151B, and the failover management program 415B determines whether to restart the operation after reflecting the journal #1 and the journal #2 or to restart the operation without reflecting the journal #1 and the journal #2. Here, a case of restarting the operation in the sub site without reflecting the journal #1 and the journal #2 is illustrated.

The failover management program 415B stores the journal that is not reflected in the volume as an unreflected journal. For example, writing is prevented in the journal volume such that the state is stored (S1020). Alternatively, the unreflected journal may be copied and stored in another area such as a volume or a memory.

The failover management program 415B accommodates and stores contents of all the volumes at the time of restarting the operation in the sub site (S1022). For example, a snapshot of the volume 151B is taken in the volume 181B. The volume in the stored state is managed as a base volume and is not used for the operation.

The processing of determining which time after the failover is to be the recovery time for restarting the operation will be described with reference to a flowchart illustrated in FIG. 15.

The failover management program 415 determines whether a journal not reflected in the volume remains in the journal volume 160B in the storage system 200B (S1210), and when the journal not reflected therein remains, the processing proceeds to S1212. When the journal not reflected therein does not remain, the processing is terminated.

When the unreflected journals still remain, the processing selects whether to restart the operation after reflecting those journals (S1212). When the operation is restarted after all the remaining journals are reflected, the processing proceeds to S1214, and when all the remaining journals are not reflected, the processing proceeds to S1216. When the remaining journals are reflected, a secondary journal processing method 1 is used (S1214), and the remaining journals are extracted in the order of time, thereby executing all the proceeding. When the operation is immediately restarted without reflecting the remaining journals, a secondary journal processing method 2 is used (S1216), and the remaining journals are saved or are stored in the journal volume 160B and writing thereto is prohibited.

After reflecting and saving the journal, the volume at the time of starting the operation in the sub site is stored as the base volume at the time of restarting the operation (S1218). For example, the snapshot is acquired. The acquired snapshot is distinguished from an existing snapshot to be identified as the base volume. Until the failback is performed after the failover, a portion where each volume of the secondary storage system is updated while continuously performing the operation in the sub site is recorded as a difference. For example, a differential bitmap is provided for each volume including a snapshot volume.

Figure 11:
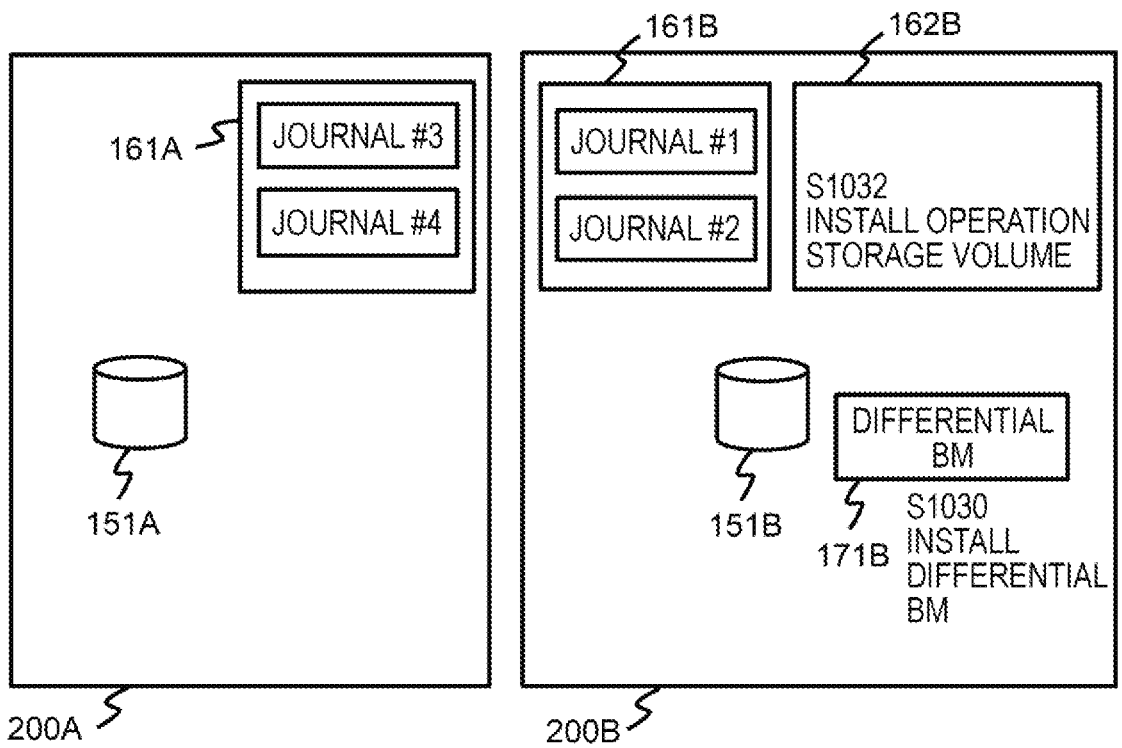
FIG. 11 is a diagram illustrating the example of processing of the secondary storage system at the time of failover of the remote copy system.

As illustrated in FIG. 11, a differential bitmap 171B is set with respect to the volume 151B which is an operation target. One differential bitmap is provided for each volume (S1030). The differential bitmap causes each bit in the bitmap to correspond to data of a predetermined data size. For example, when data of 64 KB corresponds to 1 bit, and even when 1B of 64 KB is updated, the bit is set to '1'. As an initial state, all bits of the differential bitmap are set to '0'. Referring to the differential bitmap, it is indicated that only a portion where the bit is '1' is updated, and it is indicated that a portion where the bit is '0' is not updated, that is, here, it is the same as the data of the base volume.

When the unreflected journal is still stored in the journal volume 161B, a journal volume 162B is provided for storing a new journal after the operation is restarted (S1032). The journal volume 162B may not be a volume but may be a storage area.

After the above-described setting is completed, the operation is restarted in the sub site.

Figure 12:
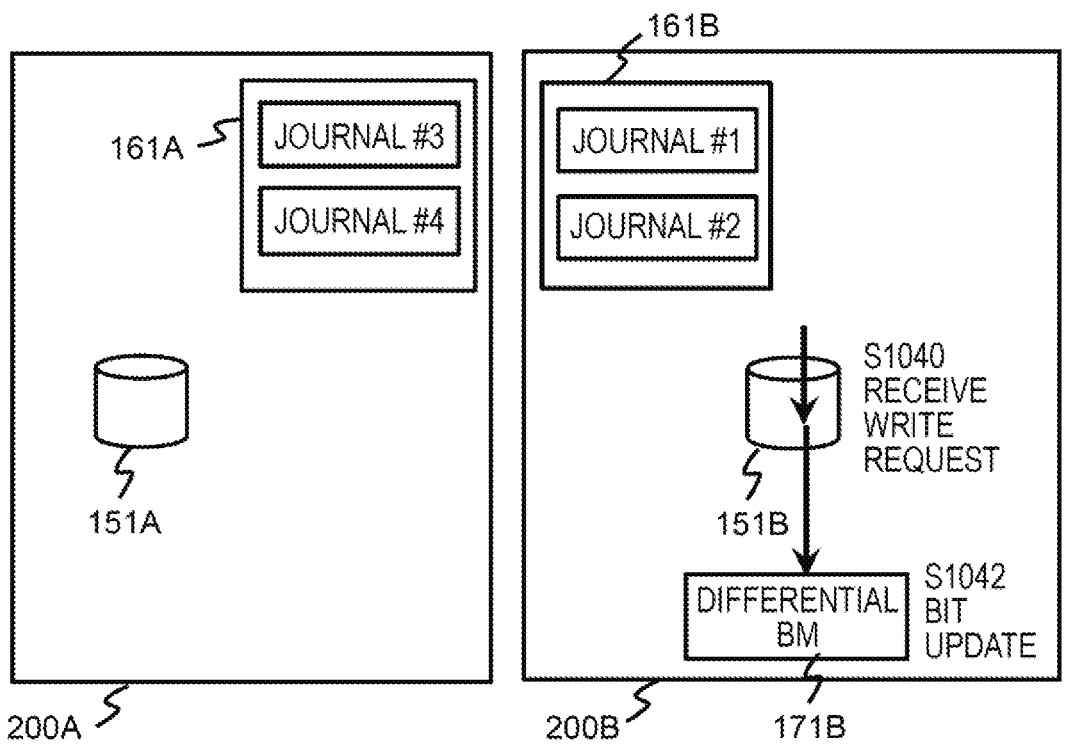
FIG. 12 is a diagram illustrating an example of write processing on the sub site side with respect to an operation after the failover of the remote copy system.

As illustrated in FIG. 12, the storage system 200B receives a write request from the host (S1040). For example, when a data update is executed with a write request to the volume 151B, the bit of the differential bitmap corresponding to the updated portion is updated from 0 to 1 (S1042).

Figure 13:
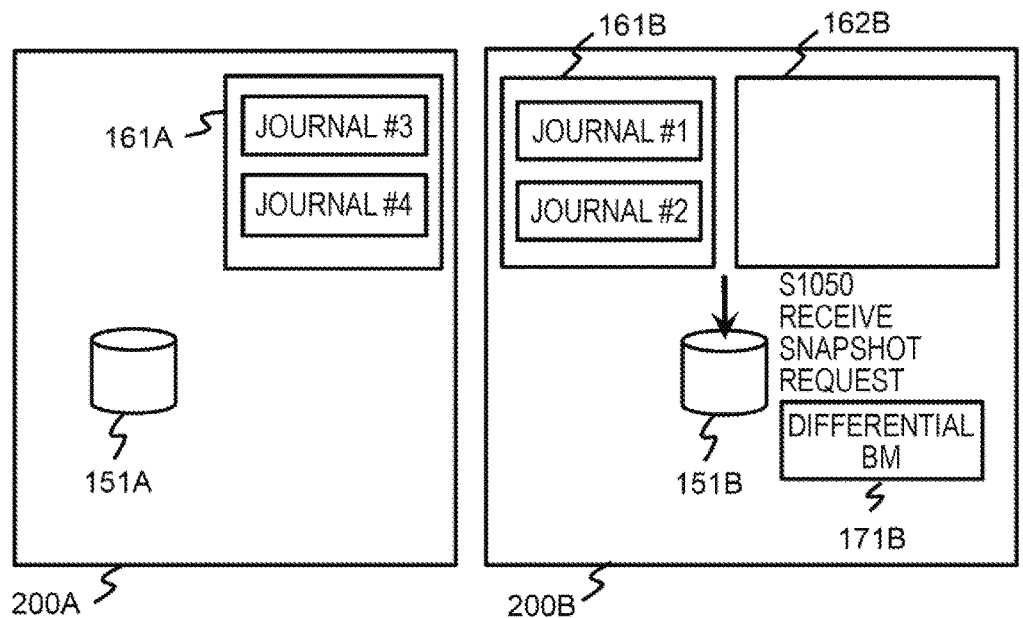
FIG. 13 is a diagram illustrating an example of snapshot processing on the sub site side with respect to the operation after the failover of the remote copy system (processing 1)
Figure 14:
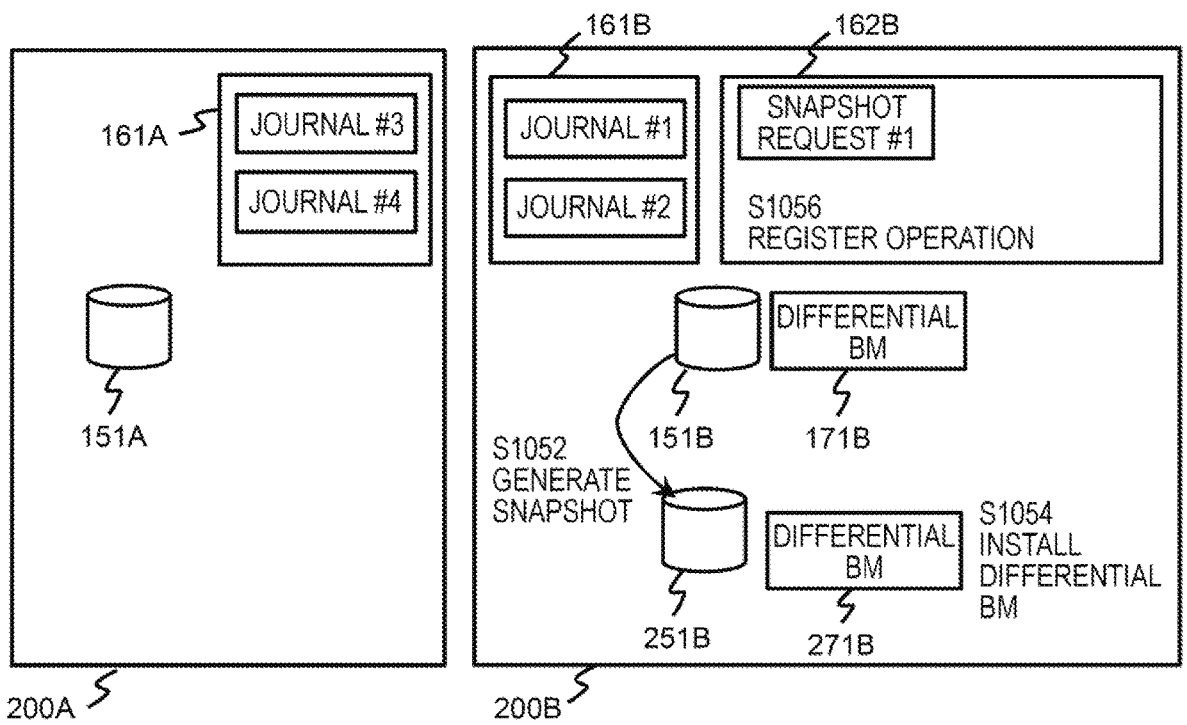
FIG. 14 is a diagram illustrating the example of the snapshot processing on the sub site side with respect to the operation after the failover of the remote copy system (processing 2)

FIGS. 13 and 14 illustrate processing when the snapshot acquisition request is received.

The storage system 200B receives the snapshot acquisition request (S1050). In response to the snapshot acquisition request, a snapshot is generated in a snapshot volume 251B and the snapshot is obtained (S1052). A differential bitmap 271B corresponding to the snapshot volume 251B is installed (S1054). After the snapshot is obtained, an operation of the snapshot is registered in the journal volume 162B (S1056). The snapshot request has various formats such as a command from a host and a user instruction from a terminal, and as a snapshot acquisition operation, a format of the snapshot request such as a snapshot request #1 is registered in the journal volume 162B in time-series order. The journal volume 162B may have the same format as that of the journal table 424. As described above, the registration is performed in the same manner as when the registration is performed in the operation 1007.

When the failure on the main site side is recovered, the failback is performed to recover the operation on the main site side. In order to cause the operation that is continuously performed in the sub site to be taken over to the main site for the failback, an operational environment of the sub site at the time of the failback is reproduced in the main site. The main site recovers the failure portion, but since the storage system 200A still remains in the state of the time when the failure occurs, it is required to reproduce the operational environment of the sub site in consideration of the above-described state. In a case where the failure on the main site side cannot guarantee that the data in the primary storage system 200A are correct, and in the case of a failure where data cannot be used such as a possibility that data are corrupted, all the data in the secondary storage system 200B may be reverse-resync to the storage system 200A. However, it takes time because it is required to copy all the data by the reverse-resync. When the failure on the main site side is a failure which is not related to the data in the primary storage system 200A, such as a primary server failure and a path failure between the primary and secondary storage systems, it is desirable to use the data remaining in the primary storage system 200A to shorten the reverse resync time and the failback time. The present invention applies to the latter case.

Since the storage system 200A and the storage system 200B are in different states at the time of failover, processing of correcting the state of the storage system 200A to the state of the storage system 200B that continuously performs the operation in the sub site at the time of failover is performed. Processing of merging the unreflected journals will be described with reference to a flowchart in FIG. 16. The processing is processing of the storage system 200B on the sub site side.

The failback management program 416 fetches a journal, which is stored in the journal volume 160A and not transferred to the secondary storage system 200B, in the primary storage system 200A into the secondary storage system 200B (S1310). A journal transfer is requested to the storage system 200A. A journal transfer method may be performed from the side of the primary storage system 200A, or may be performed according to a user instruction from a terminal.

Figure 15:
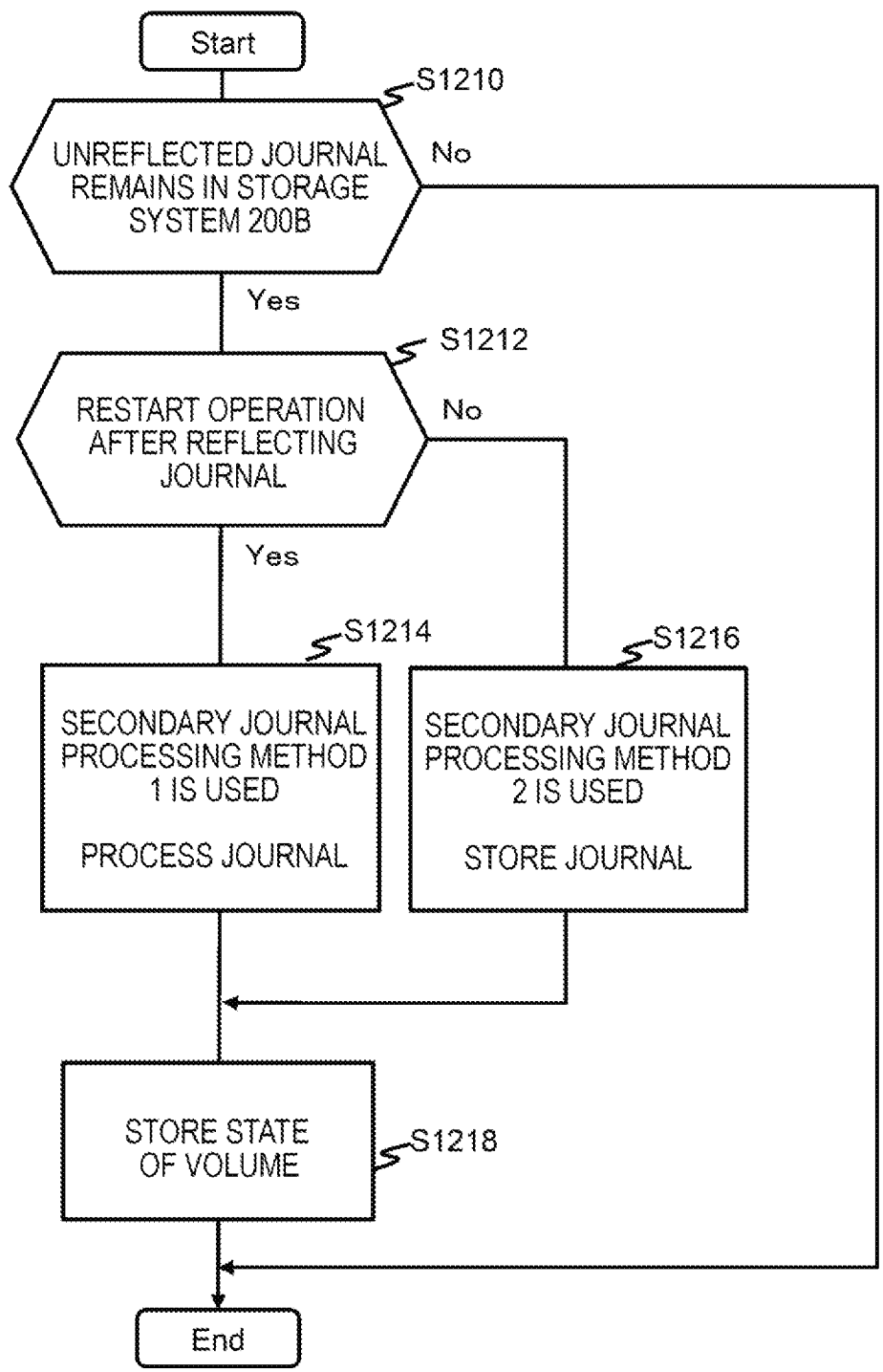
FIG. 15 is a flowchart illustrating an example of processing of determining a restart time with respect to the operation after the failover of the remote copy system.

In the case of the secondary journal processing method 1 in FIG. 15 (S1312), since the unreflected journal does not remain in the secondary storage system 200B, the fetched journal becomes the unreflected journal (S1314). In the case of the secondary journal processing method 2, since the unreflected journal remains in the secondary storage system 200, the fetched journal is merged in time-series order to obtain the unreflected journal (S1316).

When the unreflected journal is determined, reverse resync preprocessing (S1318) is performed.

The reverse resync preprocessing will be described with reference to flowcharts in FIGS. 17 and 18.

Figure 17:
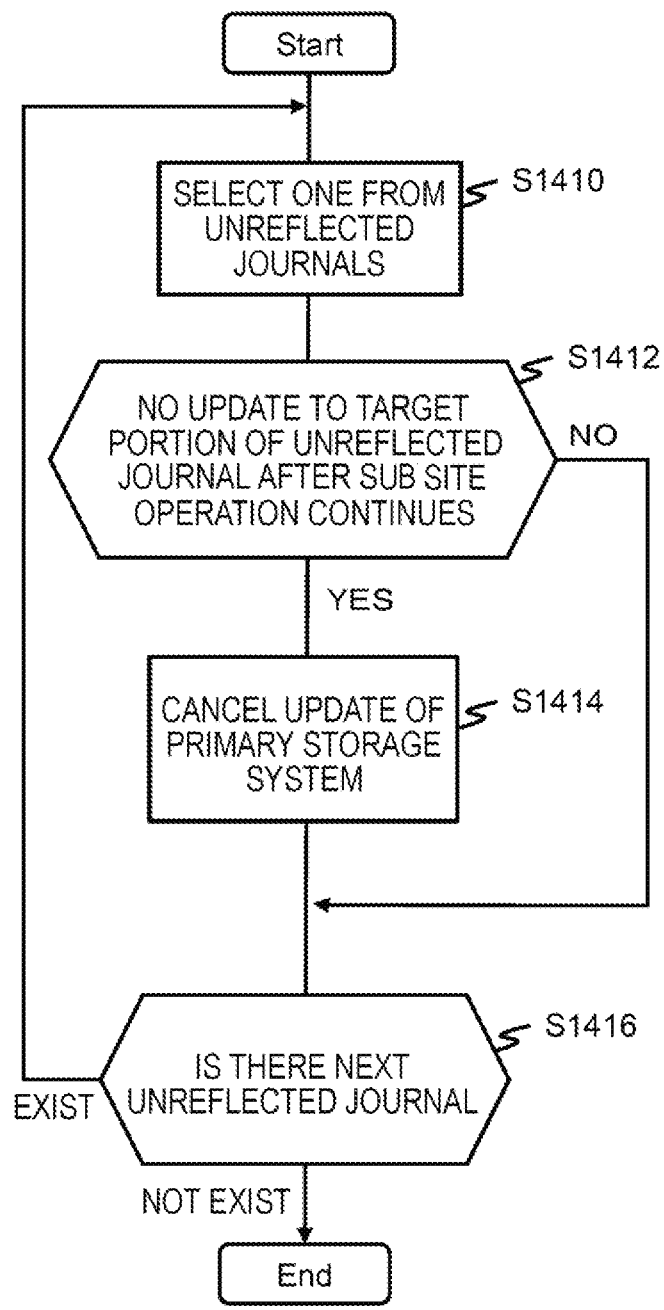
FIG. 17 is a flowchart illustrating an example of reverse resync preprocessing (write) of the remote copy system.
Figure 18:
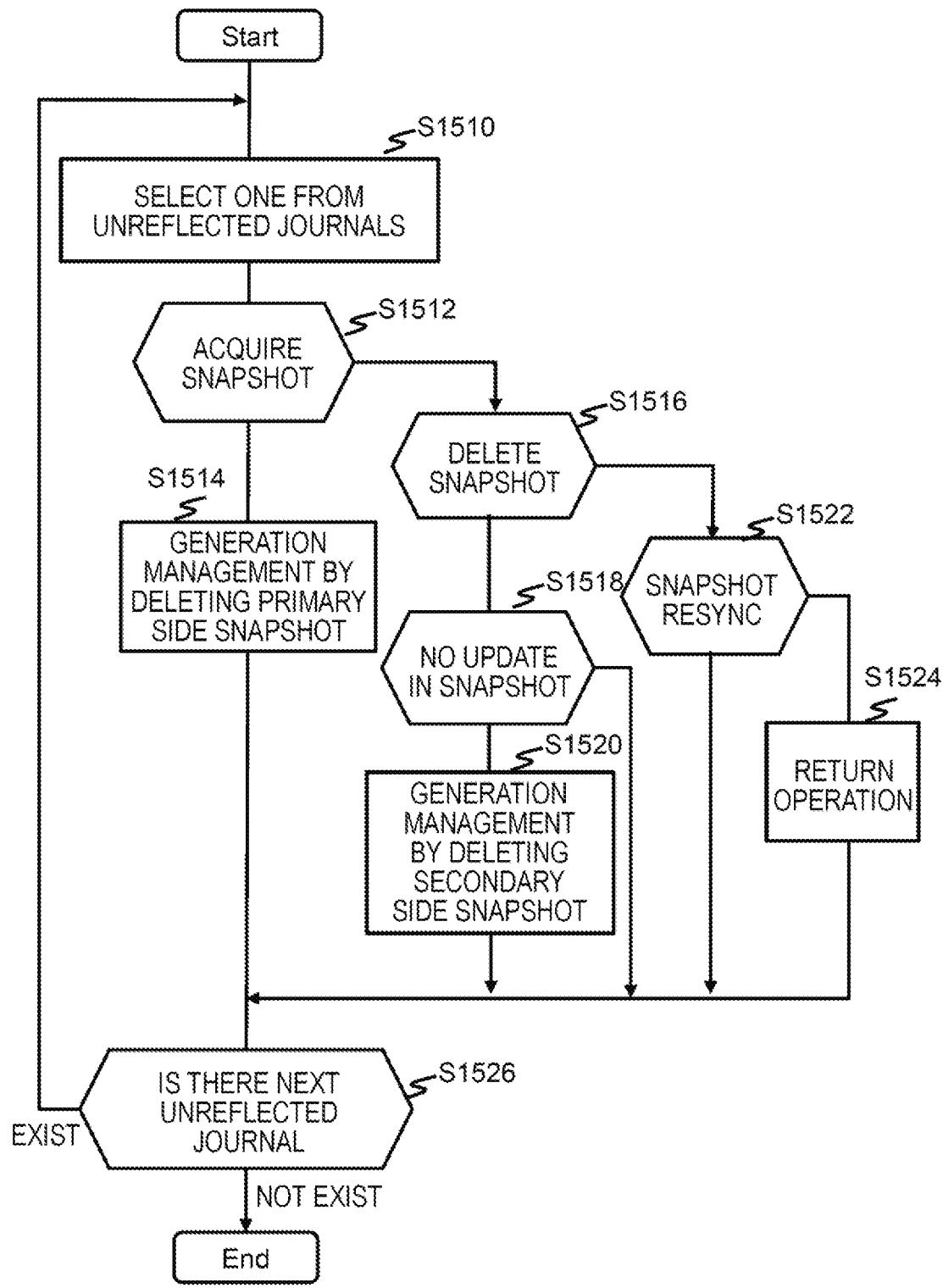
FIG. 18 is a flowchart illustrating an example of reverse resync preprocessing (snapshot) of the remote copy system.

FIGS. 17 and 18 illustrate the reverse resync preprocessing of S1318. The unreflected journals that are not reflected at the time of failover are processed one by one in time-series order, and since the processing is different when the journal is a write request or an operation (mainly related to the snapshot), the processing will be described with different drawing. FIG. 17 illustrates the processing when the journal is the write processing, and FIG. 18 illustrates the processing when the journal is the operation. The failback management program 416 is executed.

A case where the unreflected journal in FIG. 17 is the write request will be described. The unreflected journals are processed one by one from the unreflected journal determined in FIG. 16 in the order of earliest time (S1410). The processing is performed when the unreflected journal is the write request. After the failover to the sub site side, it is determined whether there is a write request for a write target address of a target volume of the write request of the selected unreflected journal during a period when the operation is continuously performed (S1412). If there is no write request, the processing proceeds to S1414, and if there is the write request, the processing proceeds to S1416. Specifically, the differential bitmap of the secondary volume in the secondary storage system 200B which is paired with the primary volume which is a target of the write request of the unreflected journal is referred to, and when there is a write to the same address as a target portion of the write request of the unreflected journal, that is, when the bit is '1', it can be seen that there is the write request, and when the bit is '0', it can be seen that there is no write request.

When there is no write request on the side of the secondary storage system 200B at the target portion of the write request, in order to match the state of the primary storage system 200A with the state of the secondary storage system 200B, processing for canceling the unreflected journal in the secondary storage system 200B to the primary storage system 200A is performed (S1414). That is, the target portion in the primary storage system 200A is rewritten to the data at the time when the failover stored in the secondary storage system 200B starts. Specifically, with respect to the target address of the target volume of the primary storage system 200A of the write request of the unreflected journal, the write request is generated for the data at the time when the failover of the secondary storage system 200B corresponding to the address starts, and transferred to the primary storage system 200A. In the secondary storage system 200B, since there is no write to the target portion after the operation is restarted, and since there is no change and data are not transferred from the secondary storage system 200B to the primary storage system 200A during the reverse resync, it is required to generate the write request to update the data. When the target portion is written for the first time in the primary storage system 200A by the write request of the unreflected journal, the data of the target portion of the primary storage system 200A are set to zero. When the target volume is a capacity virtualized volume using a new provisioning technology, the capacity allocated to the target address of the target volume in the primary storage system 200A is released.

In S1414, when there is the write request on the side of the secondary storage system 200B at the target portion of the write request, the bit of the differential bitmap of the updated portion of the differential bitmap of the volume becomes '1'. At the time of reverse resync, since data are transferred only to the portion where the bit is '1', even though the data of the write request of the unreflected journal are not reflected, the data are overwritten with the update data after the write request.

When there is the next unreflected journal, the processing proceeds to S1410, and when there is no next unreflected journal, the processing is terminated (S1416). By the above-described processing, the portion where only the primary storage system 200A is updated is corrected at the past time point.

Figure 16:
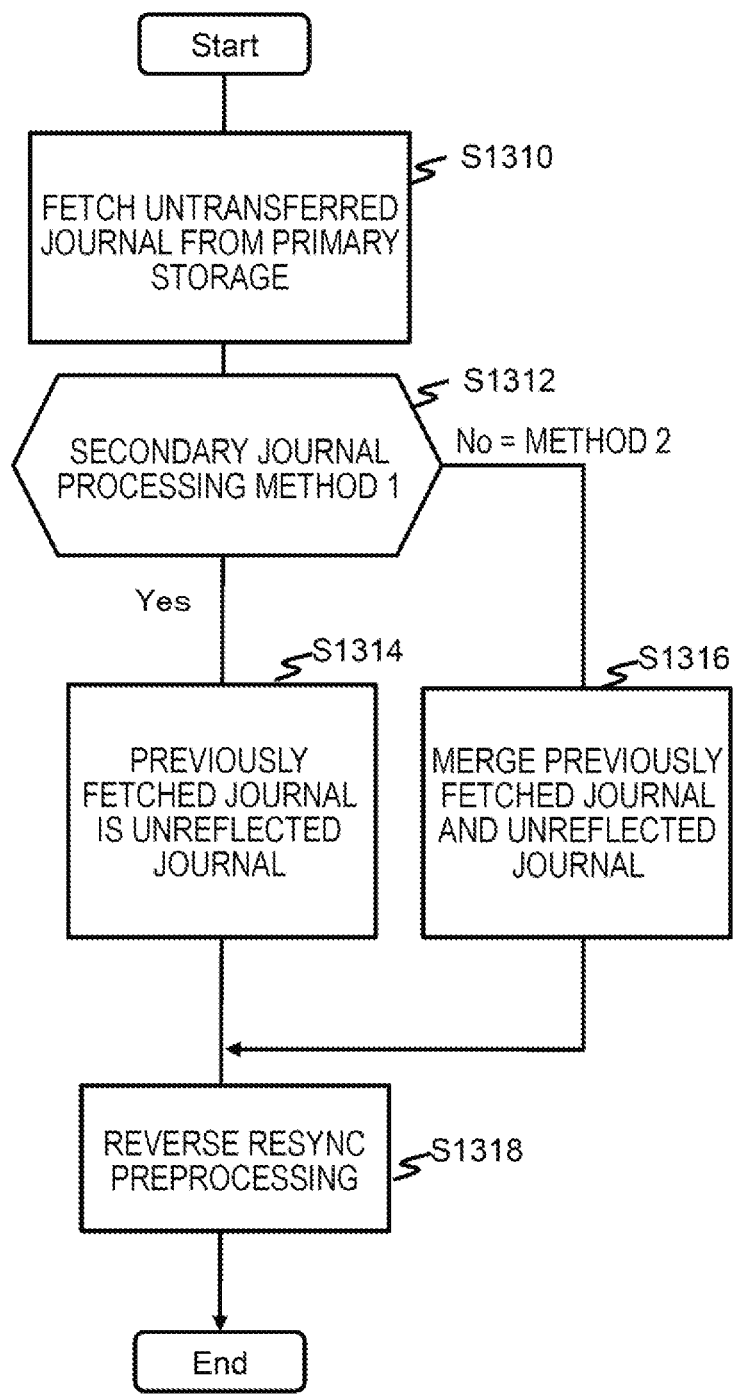
FIG. 16 is a flowchart illustrating an example of processing of merging an unreflected journal of the remote copy system.

An operation journal will be described with reference to FIG. 18. The unreflected journals determined in FIG. 16 are processed one by one in the earliest order of time (S1510). The processing is performed when the unreflected journal is an operation. It is determined whether the operation is snapshot acquisition (S1512), and when the operation is the snapshot acquisition, the processing proceeds to S1514, whereas when the operation is not the snapshot acquisition, the processing proceeds to S1516. In the same manner, hereinafter, it is determined whether the operation is snapshot deletion (S1516), and when the operation is the snapshot deletion, the processing proceeds to S1518, whereas when the operation is not the snapshot deletion, the processing proceeds to S1522. It is determined whether the operation is snapshot resync (S1522), and when the operation is the snapshot resync, the processing proceeds to S1526, whereas when the operation is not the snapshot resync, the processing proceeds to S1524.

The processing of S1514 will be described. When the selected journal is the snapshot acquisition, the snapshot is acquired in the primary storage system 200A, and the snapshot acquisition is not reflected in the secondary storage system 200B. Here, when the failback is performed, the snapshot generated only in the primary storage system 200A is deleted not to be in a state where the snapshot that should not originally exist in the primary storage system 200A remains. The snapshot deletion is executed by issuing a snapshot deletion instruction from the secondary storage system 200B or a user terminal to the primary storage system 200A. When the snapshot to be deleted is designated, the designated snapshot is indicated by a snapshot generation time or a snapshot generation number. The primary storage system 200A specifies the snapshot to be deleted from the information, and deletion of the snapshot is executed. When the snapshot is deleted, and when a snapshot with respect to the same volume is acquired before and after the snapshot to be deleted, changing is performed to refer to a reference destination of another snapshot that refers to the data of the snapshot to be deleted or directly refer to data thereof. The management of the snapshot generation in the primary storage system 200A also performs processing for deleting the generation number of the deleted snapshot.

The processing of S1518 will be described. When the selected journal is the snapshot deletion, the snapshot is deleted in the primary storage system 200A, and the snapshot deletion is not reflected in the secondary storage system 200B. Here, it is indicated that a snapshot, which should not already exist in the primary storage system 200A, exists in the secondary storage system 200B, the failover is performed, and the processing is continuously performed. When the snapshot that should be deleted is being used on the secondary side after the operation continues, the snapshot remains. When the snapshot that should be deleted is not being used on the secondary side after the operation continues, the snapshot on the secondary storage system side is deleted when the failback is performed. The deletion method is the same as described above. The generation management of the snapshot in the secondary storage system 200B is updated (S1520).

The processing of S1522 will be described. When the selected journal is snapshot resync, it is required to perform processing so that a portion that should be overwritten by performing the reverse resync is overwritten, and a portion that should originally be zero data becomes zero data. Since the processing is reflected when reverse resync processing is performed, processing is not particularly performed.

When the selected journal is an operation other than the snapshot, for example, when an attribute of the volume is set, the attribute setting which is set in the primary storage system is recovered (S1524). The operation processed in S1524 is an operation that can be processed asynchronously in the primary and sub sites. As described above, an operation that is inconsistent during the reverse resync from the secondary side is not processed here because the operation is executed in synchronization in the primary and sub sites.

Next, the reverse resync processing will be described. The reverse resync is to reproduce the operational environment of the sub site in the main site. Here, reproduction of the environment on the side of the storage system 200 will be particularly described. It significantly takes time to transfer all the data in the secondary storage system 200B to the primary storage system 200A by the reverse resync. In the case of a failure in which the data stored in the primary storage system 200A can be used, a difference from the secondary storage system 200B is extracted and only the data at a different portion are transferred thereto, so that an amount of the data transfer is suppressed as much as possible and the reverse resync processing is efficiently performed.

Figure 19:
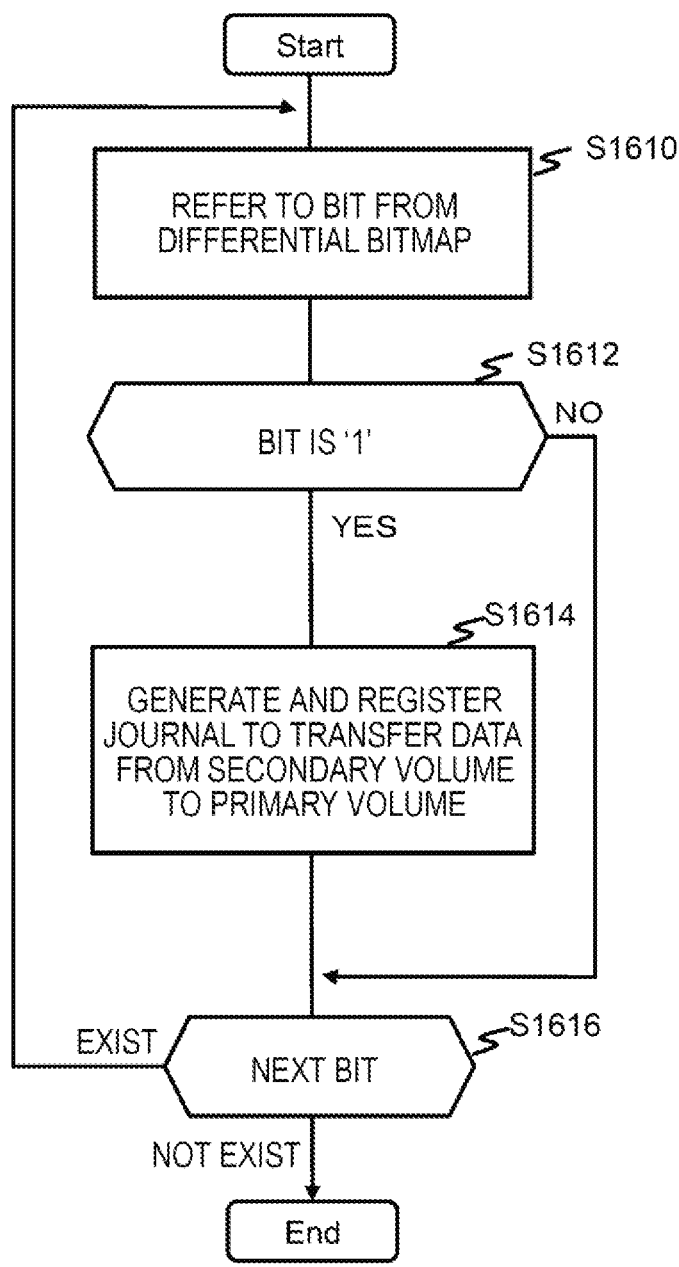
FIG. 19 is a flowchart illustrating an example of reverse resync processing (write) of the remote copy system.

A flowchart in FIG. 19 will be described. The target volumes on the side of the secondary storage system 200B are processed in order. The target volume is an operation volume, and is a volume provided to the host. The differential bitmap is provided in this volume. One bit is referred to from this differential bitmap (S1610), and when the bit is '1', that is, when a target portion of the target volume is updated (S1612), the data of the portion that is updated are read out, the volume in the primary storage system 200A is identified, and a journal for transferring a data storage address and data is generated (S1614). In the primary storage system 200A, the received data are overwritten to the target portion and an update is perform. The differential bitmap is sequentially searched from the head to the end, thereby performing the processing (S1616).

Figure 20:
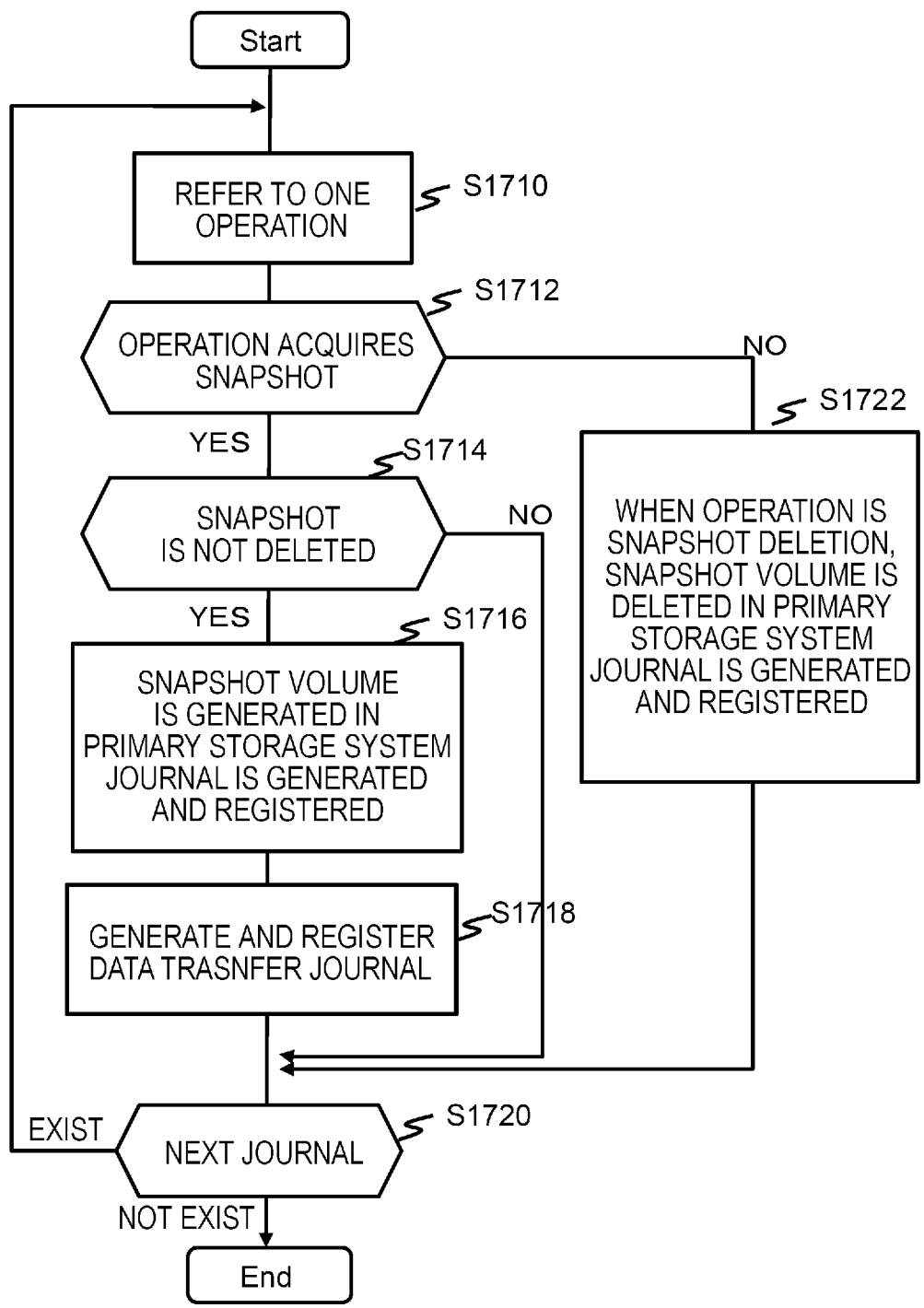
FIG. 20 is a flowchart illustrating an example of reverse resync processing (snapshot) of the remote copy system.

FIG. 20 illustrates a flowchart of processing of sequentially reproducing an operation, which is stored in the journal volume 162B storing the operation and executed after the operation is restarted in the sub site, in the main site.

When one operation stored in the journal volume 162B is referred to (S1710) and the operation is the snapshot acquisition (S1712), and when the snapshot is not deleted, that is, when there is no snapshot deletion operation with respect to the same snapshot in the journal volume 162B (S1714), in order to generate the snapshot in the primary storage system 200A, a journal for generating the snapshot is generated and registered in the primary storage 200A (S1716). The contents of the snapshot volume refer to the snapshot differential bitmap, and data are transferred only to the updated portion. The primary storage system 200A executes the journal and first generates the snapshot volume. After that, a portion where there is no update refers to the data of the original volume or the volume of the previous generation, and the contents of the snapshot volume refer to the differential bitmap of the snapshot, and the data are transferred only to the portion where the update is performed. The reason is that the portion where no update is performed refers to the data of the original volume or the volume of the previous generation. In the same manner, the snapshot generated in the primary storage system 200A can be dealt with by referring to the differential bitmap and transferring the data of the portion where the update is performed. When the snapshot is generated, the primary storage system 200A updates the generation management of the snapshot.

When the operation in S1712 is an operation other than the snapshot acquisition, and when the operation is the snapshot deletion, in order to delete the existing snapshot volume in the primary storage system 200A, a journal for instructing the primary storage system 200A to perform the snapshot deletion is generated and registered (S1722). The primary storage system 200A specifies and deletes the snapshot. After deleting the snapshot, the primary storage system 200A updates the generation management of the snapshot.

When the operation is a volume attribute change, a journal for changing the volume attribute of the primary storage system 200A is generated and registered.

Hereinabove, an example of the reverse resync method is described. As a method to reverse resync the snapshot, there are a method of reproducing an updated state after acquiring the above-described snapshot; and a method of reproducing a state at the time of actually acquiring the snapshot and acquiring the snapshot. In the latter case, after the failover to the sub site is performed, every time the snapshot in the secondary storage system 200B is acquired, a new differential bitmap is provided to the operation target volume in the secondary storage system 200B, and an update is recorded in the differential bitmap when there is the update, thereby making it possible to reproduce the state of the original volume of the snapshot when the snapshot is acquired. The primary storage system 200A reproduces the state of acquiring the snapshot and actually acquires the snapshot, thereby making it possible to generate the snapshot volume.

As described above, the remote copy system according to the embodiment includes the first storage system 200A that provides the main site; and the second storage system 200B that provides the sub site. The storage controller 101 of the storage system 200 stores the data and operation processed in the main site as a main site journal, and performs the remote copy by sending the main site journal to the sub site and sequentially processing the main site journal. After performing the failover from the main site to the sub site, the storage controller 101 thereof stores the data and operation processed in the sub site as a sub site journal. When performing the failback from the sub site to the main site, the storage controller 101 thereof cancels the unreflected operation that is not processed in the sub site after being stored in the main site journal prior to the failover in the main site, and sequentially processes the sub site journals in the main site. Therefore, after the failure of the main site is recovered, the main site can have the same operational environment as that of the sub site at that time.

According to the embodiment, even when the failure occurs in the main site, and there is the journal that is not transferred from the primary storage system to the secondary storage system, the failover to the sub site is performed such that the operational environments of the primary and sub sites can be automatically the same as each other. It is possible to provide a resurrectable storage system that can simplify the configuration management and continue the operation.

According to the embodiment, when the snapshot generation performed in the main site is the unreflected operation, the storage controller 101 can delete the snapshot. Here, when the snapshot to be deleted is referenced by another snapshot, the storage controller 101 can change the reference destination of another snapshot.

According to the embodiment, when the snapshot deletion performed in the main site is the unreflected operation, and the sub site uses the snapshot between the failover and the failback, the storage controller 101 excludes the deletion of the snapshot from a cancellation target. Therefore, it is possible to prevent the snapshot used during the failover from being deleted at the time of failback.

According to the embodiment, when executing an operation that cannot be cancelled at the time of failback in the main site, the storage controller 101 sends the operation to the sub site for processing without storing the operation in the main site journal. Therefore, it is possible to avoid a state in which the operation that cannot be cancelled remains in the main site journal in an unreflected state.

According to the embodiment, with respect to the writing processing of the unreflected data that are not processed in the sub site after being stored in the main site journal prior to the failover, when the sub site does not perform the writing processing of data with respect to the same portion prior to the failback, the storage controller 101 has a feature of generating the write request with respect to the main site by using the data at the same portion in the sub site. Therefore, it is possible to accurately cancel the unreflected data writing.

According to the embodiment, the storage controller 101 determines whether to recover the main site using the main site journal and the sub site journal, or to send all the data of the sub site to the main site for performing recovery, depending on a type of abnormality triggering the failover. Therefore, it is possible to execute an appropriate reverse resync depending on the type of abnormality.

The present invention is not limited to the above-described embodiments, but includes various modifications. For example, the embodiments are described in detail in order to describe the present invention in an easy-to-understand manner, and are not necessarily limited to the one including all the configurations described. The configuration is not limited to being deleted, and the configuration can be replaced or added.

Each of the configurations, functions, processing units, and processing methods may be realized in hardware by designing a part or all of them with, for example, an integrated circuit. The present invention can also be realized by a program code of software that realizes the function of the embodiment. Here, a storage medium in which the program code is recorded is provided to a computer, and a processor provided in the computer reads the program code stored in the storage medium. Here, the program code itself read from the storage medium realizes the function of the above-described embodiment, so that the program code itself and the storage medium storing the program code form the present invention. As a storage medium for supplying the aforementioned program code, there are, for example, a flexible disk, a CD-ROM, a DVD-ROM, a hard disk, a solid state drive (SSD), an optical disk, a magneto-optical disk, a CD-R, a magnetic tape, a non-volatile memory card, and a ROM.

The program code for realizing the function described in the embodiment can be implemented in a wide range of programs or script languages such as assembler, C/C++, perl, Shell, PHP, and Java (registered trademark).

In the above-described embodiment, a control line and an information line are shown as necessary for description, and all control lines and information lines are not shown in the product. All configurations may be connected to each other.

What is claimed is:

1. A remote copy system, comprising:
a first storage system that provides a main site; and
a second storage system that provides a sub site, wherein
a storage controller of the storage system
performs remote copy by storing data and an operation processed in the main site in a journal volume in the first storage system as a main site journal, and by sending the main site journal to the sub site for sequentially performing processing,
stores data and an operation processed in the sub site in a journal volume in the second storage system as a sub site journal after a failover from the main site to the sub site is performed, and
cancels an unreflected operation that is not processed in the sub site after being stored in the main site journal prior to the failover in the main site, and sequentially processes the sub site journal in the main site, when a failback from the sub site to the main site is performed.

2. The remote copy system according to claim 1, wherein the storage controller deletes a snapshot when generation of the snapshot performed in the main site is the unreflected operation.

3. The remote copy system according to claim 2, wherein the storage controller changes a reference destination of another snapshot when the snapshot to be deleted is referenced by the another snapshot.

4. The remote copy system according to claim 1, wherein the storage controller excludes deletion of a snapshot from a cancellation target when the deletion of the snapshot performed in the main site is an unreflected operation, and the sub site uses the snapshot between the failover and the failback.

5. The remote copy system according to claim 1, wherein when executing an operation that cannot be cancelled at the time of failback in the main site, the storage controller sends the operation to the sub site without storing the operation in the main site journal for performing processing.

6. The remote copy system according to claim 1, wherein regarding writing processing of unreflected data that are not processed in the sub site after being stored in the main site journal prior to the failover, when the sub site does not perform writing processing of data with respect to the same portion until the failback, the storage controller generates a write request to the main site by using the data at the same portion of the sub site.

7. The remote copy system according to claim 1, wherein the storage controller determines whether to recover the main site using the main site journal and the sub site journal, or to send all the data of the sub site to the main site for performing recovery, depending on a type of abnormality triggering the failover.

8. A remote copy management method for managing remote copy between a first storage system that provides a main site and a second storage system that provides a sub site, the method comprising:
performing, by a storage controller of the storage system, the remote copy by storing data and an operation processed in the main site in a journal volume in the first storage system as a main site journal, and by sending the main site journal to the sub site for sequentially performing processing;
storing, by the storage controller of the storage system, data and an operation processed in the sub site in a journal volume in the second storage system as a sub site journal after a failover from the main site to the sub site is performed, and
cancelling, by the storage controller of the storage system, an unreflected operation that is not processed in the sub site after being stored in the main site journal prior to the failover in the main site, and sequentially processing the sub site journal in the main site, when a failback from the sub site to the main site is performed.

* * * * *